United States Patent [19]
Wada et al.

[11] Patent Number: 5,559,939
[45] Date of Patent: Sep. 24, 1996

[54] METHOD AND APPARATUS FOR PREPARING A DOCUMENT CONTAINING INFORMATION IN REAL MATHEMATICAL NOTATION

[75] Inventors: Yutaka Wada, Hitachiota; Yukihiro Oda, Katsuta; Tunemasa Miyo; Yasuhiro Noguchi, both of Hitachi; Kazuo Takei, Ibaraki-ken, all of Japan

[73] Assignee: Hitachi, Ltd., Tokyo, Japan

[21] Appl. No.: 386,623

[22] Filed: Feb. 10, 1995

Related U.S. Application Data

[63] Continuation of Ser. No. 671,213, Mar. 18, 1991, abandoned.

[30] Foreign Application Priority Data

Mar. 19, 1990 [JP] Japan ................................. 2-067039

[51] Int. Cl.$^6$ ................................................. G06F 15/00
[52] U.S. Cl. ................................................. 395/146
[58] Field of Search .......................... 395/145, 144, 395/146–148, 150, 155, 161; 364/419.17, 709.12

[56] References Cited

U.S. PATENT DOCUMENTS

| | | | |
|---|---|---|---|
| 4,710,885 | 12/1987 | Litteken | 395/147 |
| 4,791,556 | 12/1988 | Vilkaitis | 395/159 |
| 4,819,161 | 4/1989 | Konno et al. | 364/578 |
| 4,852,056 | 7/1989 | Patton | 364/709.06 |
| 5,040,131 | 8/1991 | Torres | 364/521 |
| 5,146,553 | 9/1992 | Noguchi et al. | 395/146 |
| 5,148,379 | 9/1992 | Konno et al. | 371/19 |

OTHER PUBLICATIONS

Aitken, P. G., "Some Formula Fundamentals", Lotus vol. 5 No. 4 (Apr. 1989) pp. 59–61.

Custer, L., "Equation Solvers Handle Range of Math Problems: Three New Tools Take Differen Approaches", MacWeek vol. 3 No. 28 (Aug. 1 1989) pp. 54–56.

Quint, "An Interactive System for Mathematical Text Processing", Technology and Science of Informatics, vol. 2 No. 3 (1983), pp. 169–179.

Seiter, "Mathematica 1.03", MacWorld, vol. 5 No. 12 (Dec. 1988), pp. 174 and 175.

Van Egmond et al., "INFORM: An Interactive Syntax—Directed Formulae Editor", The Journal of Systems and Software, vol. 9 No. 3 (Mar. 1989) pp. 169–183.

Seiter et al., "A Trio of Equation Editors", MacWorld, vol. 5 No. 4, (Apr. 1988), pp. 185–186.

Leong, "Iris: Design of an User Interface Program for Symbolic Algebra", Proceedings of the 1986 ACM–SIGSAM Symposium on Symbolic Algebraic Manipulation (Jul. 1989), pp. 1–6.

Smith et al., "MathScribe: A User Interface for Computer Algebra Systems", Proceedings of the 1986 Symposium on Symbolic and Algebraic Computation, (Jul. 1989) pp. 7–12.

Quint, "Interactive Editing of Mathematics", Proceedings of the First International Conference on Text Processing Systems (Oct. 1984), pp. 55–68.

*Primary Examiner*—Heather R. Herndon
*Assistant Examiner*—Joseph R. Burwell
*Attorney, Agent, or Firm*—Antonelli, Terry, Stout & Kraus

[57] ABSTRACT

Each of formula constituent elements represented in real mathematical notation is written by a user via an input device on a display screen. While confirming positions of graphic elements indicative of each of the respective inputted constituent elements with respect to the display screen, the user forms a desired formula. On the basis of types of the inputted constituent elements and their positions on the display screen, an arithmetic relationship between the formula constituent elements is automatically obtained by a computer. A computer program to solve this formula is automatically produced by the computer based on the resultant arithmetic relationship. The solutions of the formula are displayed on the display screen as numeral values and graphic representations.

33 Claims, 39 Drawing Sheets

FIG. 14

| DATA ITEM | | | | VALUE |
|---|---|---|---|---|
| 26 — TITLE OF GRAPHIC ELEMENT | | | | |
| 27 — TITLE OF OPERATOR | | | | +:ADDING |
| 28 — POINTER | RIGHT REGION | | | |
| | LEFT REGION | | | |
| | CALCULATION RESULT | | | |
| 29 — COORDINATES | RIGHT REGION | Xmin | | |
| | | Xmax | | |
| | | Ymin | | |
| | | Ymax | | |
| | LEFT REGION | Xmin | | |
| | | Xmax | | |
| | | Ymin | | |
| | | Ymax | | |
| | ELEMENT | Xmin | | |
| | | Xmax | | |
| | | Ymin | | |
| | | Ymax | | |

| DATA ITEM | | | VALUE |
|---|---|---|---|
| GRAPHIC ELEMENT NAME | | | |
| OPERATOR NAME | | | -:FRACTION |
| POINTER | NUMERATOR | | |
| | DENOMINATOR | | |
| | CALCULATION RESULT | | |
| COORDINATE | NUMERATOR | Xmin | |
| | | Xmax | |
| | | Ymin | |
| | | Ymax | |
| | DENOMINATOR | Xmin | |
| | | Xmax | |
| | | Ymin | |
| | | Ymax | |
| | ELEMENT | Xmin | |
| | | Xmax | |
| | | Ymin | |
| | | Ymax | |

25 (table), 26 GRAPHIC ELEMENT NAME, 27 OPERATOR NAME, 28 POINTER, 29 COORDINATE

FIG. 16

| DATA ITEM | | | VALUE |
|---|---|---|---|
| GRAPHIC ELEMENT NAME | | | |
| OPERATOR NAME | | | ( ) : BRACKET |
| POINTER | WITHIN BRACKET | | |
| | POWER | | |
| | CALCULATION RESULT | | |
| COORDINATE | WITHIN BRACKET | Xmin | |
| | | Xmax | |
| | | Ymin | |
| | | Ymax | |
| | POWER | Xmin | |
| | | Xmax | |
| | | Ymin | |
| | | Ymax | |
| | ELEMENT | Xmin | |
| | | Xmax | |
| | | Ymin | |
| | | Ymax | |

25 (table)
26 — GRAPHIC ELEMENT NAME
27 — OPERATOR NAME
28 — POINTER
29 — COORDINATE

FIG. 17

| DATA ITEM | | | VALUE |
|---|---|---|---|
| GRAPHIC ELEMENT NAME | | | |
| SYMBOL NAME | | | A |
| POINTER | POWER | | |
| | CALCULATION RESULT | | |
| COORDINATE | POWER | Xmin | |
| | | Xmax | |
| | | Ymin | |
| | | Ymax | |
| | ELEMENT | Xmin | |
| | | Xmax | |
| | | Ymin | |
| | | Ymax | |

25

26 — GRAPHIC ELEMENT NAME
27 — SYMBOL NAME
28 — POINTER
29 — COORDINATE

FIG. 18

| DATA ITEM | | | VALUE |
|---|---|---|---|
| GRAPHIC ELEMENT NAME | | | |
| NUMERAL VALUE | | | 1 2 3 |
| POINTER | POWER | | |
| | CALCULATION RESULT | | |
| COORDINATE | POWER | Xmin | |
| | | Xmax | |
| | | Ymin | |
| | | Ymax | |
| | ELEMENT | Xmin | |
| | | Xmax | |
| | | Ymin | |
| | | Ymax | |

FIG. 19

| | DATA ITEM | | | |
|---|---|---|---|---|
| 26 | GRAPHIC ELEMENT NAME | | | |
| 27 | FUNCTION NAME | | | e : EXPONENTIAL FUNCTION |
| 28 | POINTER | ARGUMENT | | |
| | | CALCULATION RESULT | | |
| 29 | COORDINATE | ARGUMENT | Xmin | |
| | | | Xmax | |
| | | | Ymin | |
| | | | Ymax | |
| | | ELEMENT | Xmin | |
| | | | Xmax | |
| | | | Ymin | |
| | | | Ymax | |

| DATA ITEM | | | VALUE |
|---|---|---|---|
| GRAPHIC ELEMENT NAME | | | |
| FUNCTION NAME | | | COS:COSINE FUNCTION |
| POINTER | ARGUMENT | | |
| | POWER | | |
| | CALCULATION RESULT | | |
| COORDINATE | ARGUMENT | Xmin | |
| | | Xmax | |
| | | Ymin | |
| | | Ymax | |
| | POWER | Xmin | |
| | | Xmax | |
| | | Ymin | |
| | | Ymax | |
| | ELEMENT | Xmin | |
| | | Xmax | |
| | | Ymin | |
| | | Ymax | |

25 (table)
26 GRAPHIC ELEMENT NAME
27 FUNCTION NAME
28 POINTER
29 COORDINATE

FIG. 31

$$\frac{(B-1)^2}{10} + \boxed{\text{COS}}$$

74, 76, 78

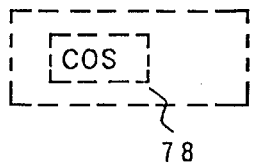

62
| GRAPHIC ELEMENT NAME | g1 |
|---|---|
| SYMBOL NAME | B |
| POINTER — POWER | |
| POINTER — CALCULATION RESULT | g2 |

64
| GRAPHIC ELEMENT NAME | g2 |
|---|---|
| OPERATOR NAME | − |
| POINTER — LEFT REGION | g1 |
| POINTER — RIGHT REGION | g3 |
| POINTER — CALCULATION RESULT | g4 |

67
| GRAPHIC ELEMENT NAME | g3 |
|---|---|
| NUMERAL VALUE | 1 |
| POINTER — POWER | |
| POINTER — CALCULATION RESULT | g2 |

69
| GRAPHIC ELEMENT NAME | g4 |
|---|---|
| OPERATOR NAME | ( ) |
| POINTER — WITHIN BRACKET | g2 |
| POINTER — POWER | g5 |
| POINTER — CALCULATION RESULT | g6 |

71
| GRAPHIC ELEMENT NAME | g5 |
|---|---|
| NUMERAL VALUE | 2 |
| POINTER — POWER | |
| POINTER — CALCULATION RESULT | g4 |

73
| GRAPHIC ELEMENT NAME | g6 |
|---|---|
| OPERATOR NAME | FRACTION |
| POINTER — NUMERATOR | g4 |
| POINTER — DENOMINATOR | g7 |
| POINTER — CALCULATION RESULT | g8 |

75
| GRAPHIC ELEMENT NAME | g7 |
|---|---|
| NUMERAL VALUE | 10 |
| POINTER — POWER | |
| POINTER — CALCULATION RESULT | g6 |

77
| GRAPHIC ELEMENT NAME | g8 |
|---|---|
| OPERATOR NAME | + |
| POINTER — LEFT REGION | g6 |
| POINTER — RIGHT REGION | g9 |
| POINTER — CALCULATION RESULT | |

65

79
| GRAPHIC ELEMENT NAME | g9 |
|---|---|
| OPERATOR NAME | COS |
| POINTER — ARGUMENT | g6 |
| POINTER — POWER | |
| POINTER — CALCULATION RESULT | g8 |

FIG. 32

$$\frac{(B-1)^2}{10} + \cos \boxed{D}$$

74, 76, 78, 80

62
| GRAPHIC ELEMENT NAME | g1 |
|---|---|
| SYMBOL NAME | B |
| POINTER — POWER | |
| POINTER — CALCULATION RESULT | g2 |

64
| GRAPHIC ELEMENT NAME | g2 |
|---|---|
| OPERATOR NAME | − |
| POINTER — LEFT REGION | g1 |
| POINTER — RIGHT REGION | g3 |
| POINTER — CALCULATION RESULT | g4 |

67
| GRAPHIC ELEMENT NAME | g3 |
|---|---|
| NUMERAL VALUE | 1 |
| POINTER — POWER | |
| POINTER — CALCULATION RESULT | g2 |

69
| GRAPHIC ELEMENT NAME | g4 |
|---|---|
| OPERATOR NAME | ( ) |
| POINTER — WITHIN BRACKET | g2 |
| POINTER — POWER | g5 |
| POINTER — CALCULATION RESULT | g6 |

71
| GRAPHIC ELEMENT NAME | g5 |
|---|---|
| NUMERAL VALUE | 2 |
| POINTER — POWER | |
| POINTER — CALCULATION RESULT | g4 |

73
| GRAPHIC ELEMENT NAME | g6 |
|---|---|
| OPERATOR NAME | FRACTION |
| POINTER — NUMERATOR | g4 |
| POINTER — DENOMINATOR | g7 |
| POINTER — CALCULATION RESULT | g8 |

75
| GRAPHIC ELEMENT NAME | g7 |
|---|---|
| NUMERAL VALUE | 10 |
| POINTER — POWER | |
| POINTER — CALCULATION RESULT | g6 |

77
| GRAPHIC ELEMENT NAME | g8 |
|---|---|
| OPERATOR NAME | + |
| POINTER — LEFT REGION | g6 |
| POINTER — RIGHT REGION | g9 |
| POINTER — CALCULATION RESULT | |

81
| GRAPHIC ELEMENT NAME | g10 |
|---|---|
| SYMBOL NAME | D |
| POINTER — POWER | |
| POINTER — CALCULATION RESULT | g9 |

79
| GRAPHIC ELEMENT NAME | g9 |
|---|---|
| OPERATOR NAME | COS |
| POINTER — ARGUMENT | g10 |
| POINTER — POWER | |
| POINTER — CALCULATION RESULT | g8 |

$$\boxed{\phantom{xxx}} = \boxed{\dfrac{(B-1)^2}{10} \boxed{+} \text{COSD}}$$
           82

62
| GRAPHIC ELEMENT NAME | | g1 |
|---|---|---|
| SYMBOL NAME | | B |
| POINTER | POWER | |
| | CALCULATION RESULT | g2 |

64
| GRAPHIC ELEMENT NAME | | g2 |
|---|---|---|
| OPERATOR NAME | | − |
| POINTER | LEFT REGION | g1 |
| | RIGHT REGION | g3 |
| | CALCULATION RESULT | g4 |

67
| GRAPHIC ELEMENT NAME | | g3 |
|---|---|---|
| NUMERAL VALUE | | 1 |
| POINTER | POWER | |
| | CALCULATION RESULT | g2 |

69
| GRAPHIC ELEMENT NAME | | g4 |
|---|---|---|
| OPERATOR NAME | | ( ) |
| POINTER | WITHIN BRACKET | g2 |
| | POWER | g5 |
| | CALCULATION RESULT | g6 |

71
| GRAPHIC ELEMENT NAME | | g5 |
|---|---|---|
| NUMERAL VALUE | | 2 |
| POINTER | POWER | |
| | CALCULATION RESULT | g4 |

73
| GRAPHIC ELEMENT NAME | | g6 |
|---|---|---|
| OPERATOR NAME | | FRACTION |
| POINTER | NUMERATOR | g4 |
| | DENOMINATOR | g7 |
| | CALCULATION RESULT | g8 |

75
| GRAPHIC ELEMENT NAME | | g7 |
|---|---|---|
| NUMERAL VALUE | | 10 |
| POINTER | POWER | |
| | CALCULATION RESULT | g6 |

77
| GRAPHIC ELEMENT NAME | | g8 |
|---|---|---|
| OPERATOR NAME | | + |
| POINTER | LEFT REGION | g6 |
| | RIGHT REGION | g9 |
| | CALCULATION RESULT | g11 |

81
| GRAPHIC ELEMENT NAME | | g10 |
|---|---|---|
| SYMBOL NAME | | D |
| POINTER | POWER | |
| | CALCULATION RESULT | g9 |

79
| GRAPHIC ELEMENT NAME | | g9 |
|---|---|---|
| OPERATOR NAME | | COS |
| POINTER | ARGUMENT | g10 |
| | POWER | |
| | CALCULATION RESULT | g8 |

83
| GRAPHIC ELEMENT NAME | | g11 |
|---|---|---|
| OPERATOR NAME | | = |
| POINTER | LEFT HAND | g6 |
| | RIGHT HAND | g8 |
| | CALCULATION RESULT | • • |

$$\boxed{A}_{84} = \frac{(B-1)^2}{10} + COSD$$

82

62
| GRAPHIC ELEMENT NAME | g1 |
|---|---|
| SYMBOL NAME | B |
| POINTER | POWER | |
| | CALCULATION RESULT | g2 |

67

| GRAPHIC ELEMENT NAME | g3 |
|---|---|
| NUMERAL VALUE | 1 |
| POINTER | POWER | |
| | CALCULATION RESULT | g2 |

71

| GRAPHIC ELEMENT NAME | g5 |
|---|---|
| NUMERAL VALUE | 2 |
| POINTER | POWER | |
| | CALCULATION RESULT | g4 |

| GRAPHIC ELEMENT NAME | g7 |
|---|---|
| NUMERAL VALUE | 10 |
| POINTER | POWER | |
| | CALCULATION RESULT | g6 |

75

| GRAPHIC ELEMENT NAME | g10 |
|---|---|
| SYMBOL NAME | D |
| POINTER | POWER | |
| | CALCULATION RESULT | g9 |

81

| GRAPHIC ELEMENT NAME | g12 |
|---|---|
| SYMBOL NAME | A |
| POINTER | POWER | |
| | CALCULATION RESULT | g11 |

85

64
| GRAPHIC ELEMENT NAME | g2 |
|---|---|
| OPERATOR NAME | − |
| POINTER | LEFT REGION | g1 |
| | RIGHT REGION | g3 |
| | CALCULATION RESULT | g4 |

69
| GRAPHIC ELEMENT NAME | g4 |
|---|---|
| OPERATOR NAME | ( ) |
| POINTER | WITHIN BRACKET | g2 |
| | POWER | g5 |
| | CALCULATION RESULT | g6 |

73
| GRAPHIC ELEMENT NAME | g6 |
|---|---|
| OPERATOR NAME | FRACTION |
| POINTER | NUMERATOR | g4 |
| | DENOMINATOR | g7 |
| | CALCULATION RESULT | g8 |

77
| GRAPHIC ELEMENT NAME | g8 |
|---|---|
| OPERATOR NAME | + |
| POINTER | LEFT REGION | g6 |
| | RIGHT REGION | g9 |
| | CALCULATION RESULT | g11 |

79
| GRAPHIC ELEMENT NAME | g9 |
|---|---|
| OPERATOR NAME | COS |
| POINTER | ARGUMENT | g10 |
| | POWER | |
| | CALCULATION RESULT | g8 |

65
| GRAPHIC ELEMENT NAME | g11 |
|---|---|
| OPERATOR NAME | = |
| POINTER | LEFT HAND | g12 |
| | RIGHT HAND | g8 |
| | CALCULATION RESULT | |

| | | | |
|---|---|---|---|
| LOAD | ≒1 | ADR1 | |
| LOAD | ≒2 | ADR2 | |
| LOAD | ≒10 | ADR3 | |
| READ | DEV1 | ADR4 | |
| READ | DEV2 | ADR5 | |
| SUB | ADR4 | ADR1 | ADR6 |
| MULT | ADR6 | ADR6 | ADR7 |
| QUOT | ADR7 | ADR3 | ADR8 |
| JMP | ADR* | ADR5 | ADR9 |
| ADD | ADR8 | ADR9 | ADR10 |
| LOAD | ADR10 | ADR11 | |
| WRITE | DEV3 | ADR11 | |
| END | | | |

| INSTRUCTIONS | MICROCOMPUTER | |
| :---: | :---: | :---: |
| | CPU1 | CPU2 |
| ADD | 10010001 | 10100001 |
| SUB | 10010010 | 10100010 |
| MULT | 10010011 | 10100011 |
| QUOT | 10010100 | 10100100 |
| LOAD | 10010101 | 10100101 |
| WRITE | 10010110 | 10100110 |
| JMP | 10010111 | 10100111 |
| END | 10011000 | 10101000 |

METHOD AND APPARATUS FOR PREPARING A DOCUMENT CONTAINING INFORMATION IN REAL MATHEMATICAL NOTATION

This application is a continuation of application Ser. No. 07/671,213, filed Mar. 18, 1991, and now abandoned.

BACKGROUND OF THE INVENTION

The present invention generally relates to a document forming or preparation method and a document forming or preparation apparatus. More specifically, the present invention is directed to a document forming or preparation method and an apparatus for forming or preparing a document, in which figures and documents are entered via input/output devices capable of representing graphic information.

In wordprocessors for forming documents with employment of computers, such as the apparatus described in JP-A-63-83861, there is employed a method in which control symbols are inserted in the documents to distinguish a formula portion from a sentence portion, and the attached formula portion is inputted, whereby the calculation contents of the thus inputted formula (for instance, A=2+3) are sequentially interpreted and after the calculation results are directly obtained, the numeral values obtained as the calculation results are assembled into the documents under production.

Also, in accordance with the document editing apparatus as described in JP-A-1-211067, a plurality of formula programs are stored in memories, the relevant formula program is selected when the formulae to be entered into the document are inputted, and then the numeral values are substituted for the selected formula program so as to obtain the calculation results. The calculation results are outputted to a predetermined region within the document under formation. That is to say, the process operation for displaying data having forms of documents and notes is independently performed with respect to the process operation for executing business calculations with input/output data, so that the data may be freely read/written between these process operations.

In the wordprocessor apparatus as described in JP-A-63-83861, arbitrary formulae with employment of the four rules of algebraic operators are inputted into the documents, and then the calculation results of the formulae may be outputted to the document. All of the formulae to be inputted other than the symbols indicative of the answers are represented by the operators and numeral values. However, when a formula is set, this formula is described as a symbol series in independent data files. Since it is necessary to utilize control signals to identify columns from which numeral values are taken out, for the formulae described in the data files, the formulae, and also column in which results of formulae are stored, which have been written with a free form in documents cannot be directly utilized. Further, since calculation contents of formulae are successively interpreted by an interpreter so as to obtain calculation results, there is another problem that data processing speeds are delayed when various data processing operations are combined with each other, which involve data input/output processing operations, and functional calculation operations with trigonometric functions, exponential functions and specific functions. In addition, no consideration is made that numeral values which are not contained in formulae are to be substituted for variables contained in the formulae, although only other numeral values contained in other formulae are employed as data used for formula computations.

On the other hand, in accordance with the document editing apparatus, the program to execute the business calculation process for forming notes and the like must be previously stored in the storage device. To this end, various types of formula programs suitable for various computation cases must be formed in advance and then stored in the storage device. However, it is very difficult to previously produce such various types of formula programs in order to accommodate various computation cases. Also, if there is no formula program suitable for a formula to be inputted into a document, the document forming work must be interrupted, and a suitable computation program formed and stored in the storage device.

In the above-described control devices according to the prior art, only the calculation results of the formulae are handled, no consideration is given that the numeral value data which are outputted as control instructions to the objects to be controlled are stored and are again utilized. Furthermore, since the formulae are directly entered into the separate data files in the symbol series, no specific care is taken in combination with the documents.

SUMMARY OF THE INVENTION

The present invention has been made in an attempt to solve the above-described problems, and therefore has as an object the providing of a document-forming or document-preparation method and an apparatus for forming or preparing a document, capable of readily acquiring arithmetic information with respect to arbitrary algebraic expressions presented in real mathematical notation, which may function as document information.

The object of the present invention may be achieved by forming programs with employment of information on the algebraic expressions which have been expressed in a natural language, i.e. real mathematical notation, and entered, and also by preparing documents which contain the above-described algebraic expressions, inputted sentences and various information obtained by executing these programs.

Since the programs have been formed with employment of the information on the algebraic expressions indicated in a real mathematical notation and the algebraic expressions are employed as the information for these documents, the documents containing the algebraic expressions represented in a real mathematical notation may be formed, and furthermore the arithmetic information with regard to the above-described arbitrary algebraic expressions may be easily obtained.

BRIEF DESCRIPTION OF THE DRAWINGS

FIGS. 14 to 20 are explanatory diagrams showing list formed data structures corresponding to the formula constructive elements indicated in FIGS. 7 to 13;

FIGS. 23 to 34 sequentially represent both input/arrangement examples of the formula constructive elements when the process as defined in the step "F" of FIG. 3 is executed, and also variations in the data structures of the respective formula constructive elements in connection with these input/arrangement examples;

FIG. 44 is an explanatory diagram of the formed calculation process program;

FIG. 48 is an explanatory diagram of a control program which has been obtained by the process sequence shown in FIG. 46.

DESCRIPTION OF THE PREFERRED EMBODIMENTS

A document forming apparatus (for instance, a design document editing apparatus) according to a preferred embodiment of the present invention will now be described. It should be noted that a design document is one example of a document.

Figure 1:
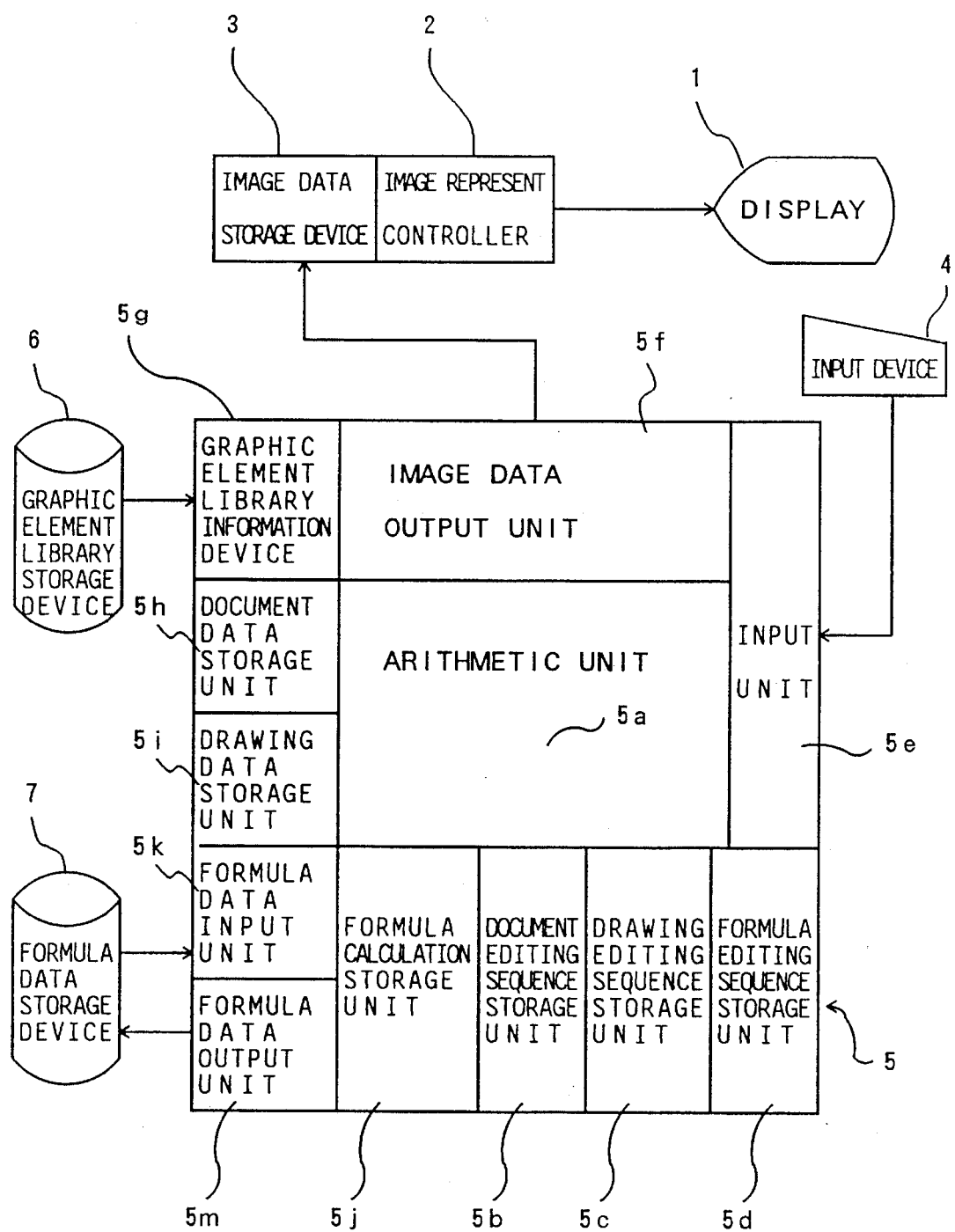
FIG. 1 is a schematic diagram of a design document forming apparatus according to a preferred embodiment of the present invention.

In FIG. 1, there is shown an arrangement of a design document editing apparatus according to this preferred embodiment of the invention. In the design document editing apparatus shown in FIG. 1, an arithmetic processing apparatus 5 is arranged with an arithmetic unit 5a; a document editing sequence storage unit 5b; a drawing editing sequence storage unit 5c; a formula editing sequence storage unit 5d; an input unit 5e; an image data output unit 5f; a graphic element library information input unit 5g; a document data storage unit 5h; a drawing data storage unit 5i; a formula calculation storage unit 5j; a formula data input unit 5k; and a formula data output unit 5m. The arithmetic unit 5a sequentially calls the process sequences which have been stored in the respective sequence storage units 5b, 5c, 5d and 5j, and then executes the process operations based upon these process sequences.

An image data storage apparatus 3 stores therein image data outputted from the arithmetic processing apparatus so as to display an operator, a symbol or the like of a formula constructive element, i.e. a constituent element of a formula, as a graphic element.

An image display control apparatus 2 fetches the image data of the graphic element to be displayed from the image data storage apparatus 3 and thus displays a formula on a display device 1. An input device 4 inputs both the type of formula constituent element and the position on a display screen for a graphic element as data in response to an instruction made by a user, whenever the user enters a formula. Reference numeral 6 denotes a graphic element library storage device, and reference numeral 7 indicates a formula data storage device.

The design document editing apparatus with the above-described construction, according to the present invention, may be arranged either as a separate product, or as a part of an input/output processing function unit for a computer system.

Figure 2:
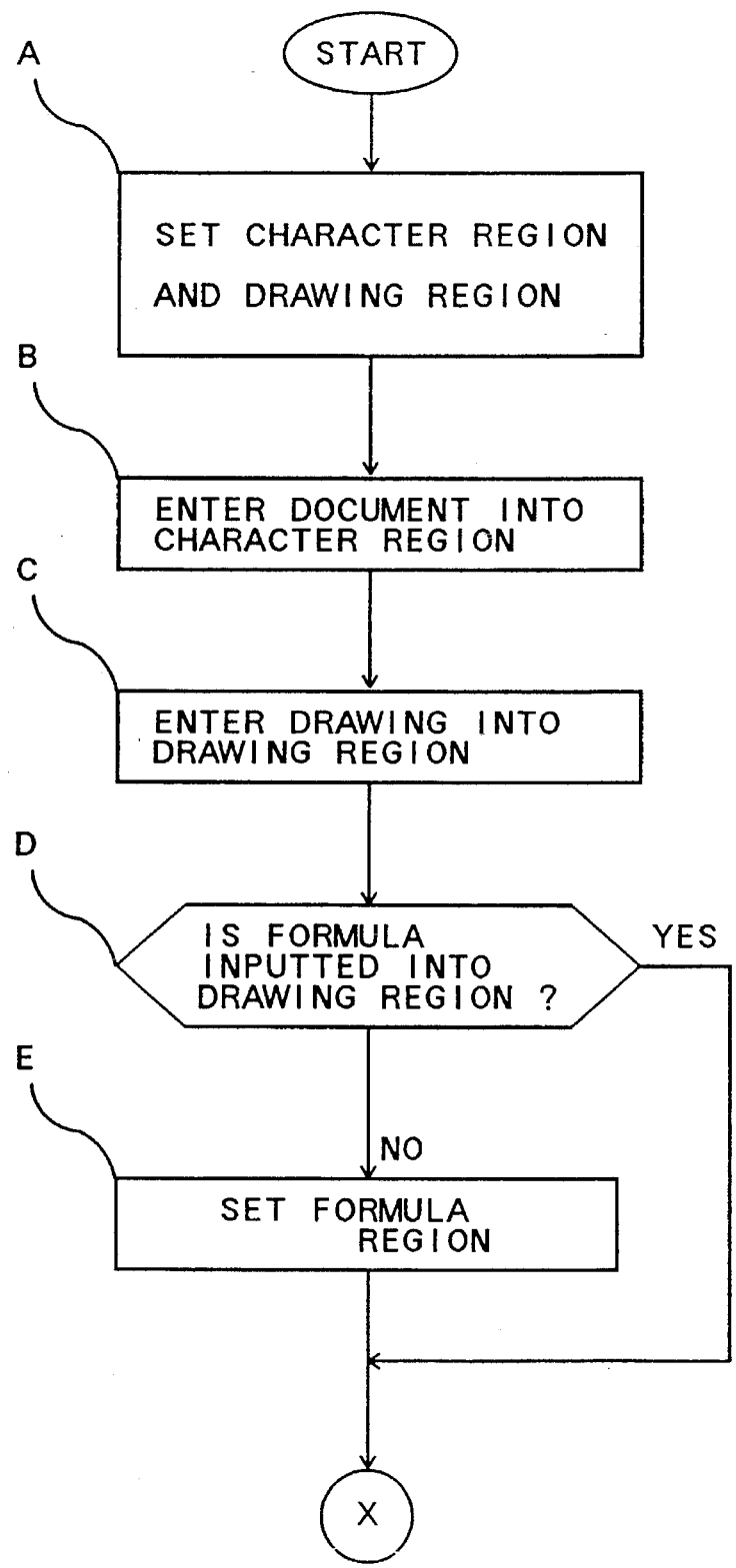
FIGS. 2 and 3 are flowcharts showing process sequences executed in the design document forming apparatus shown in FIG. 1.
Figure 3:
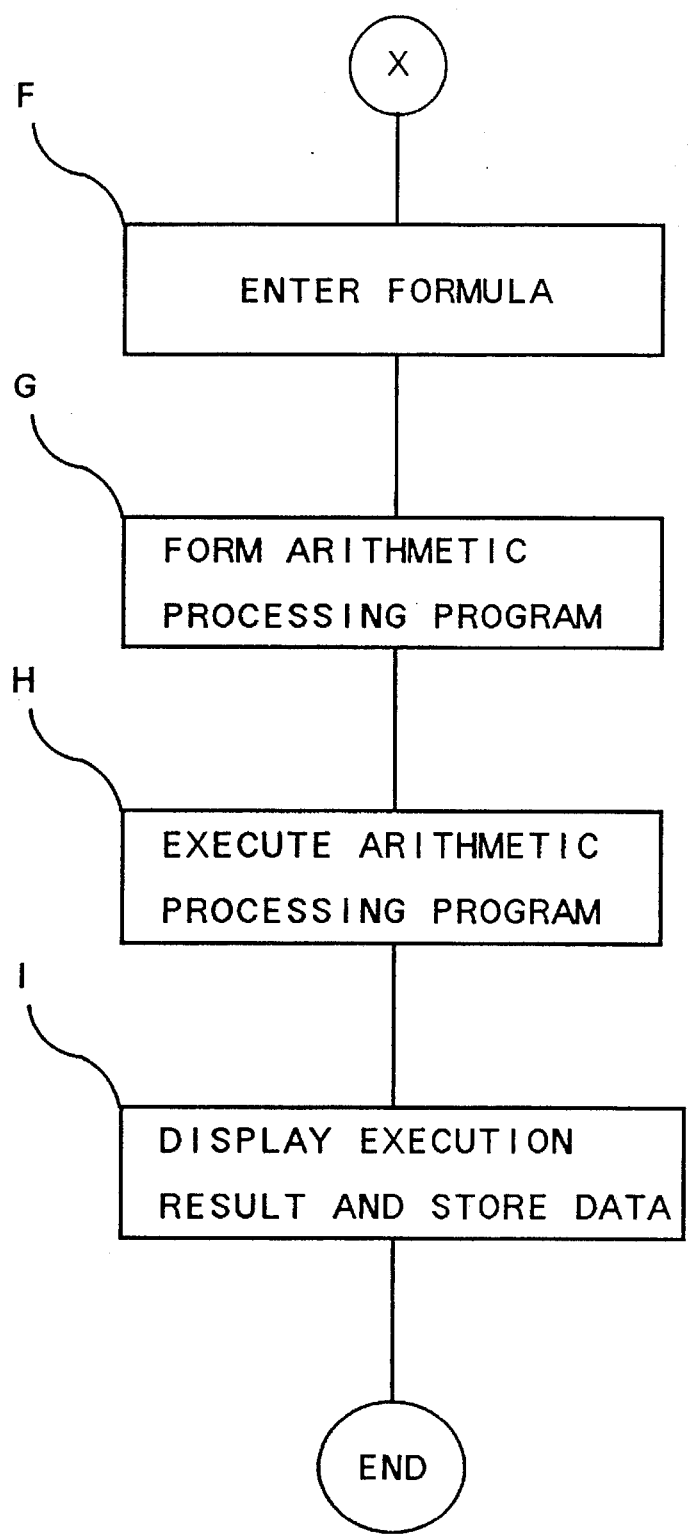

FIGS. 2 and 3 are flowcharts for explaining a process in which a document is inputted into a character region, a formula is entered by arranging an operator, a symbol, a function, a numeral value and the like as a graphic element, and an execution result of a calculation process program based upon the entered formula is displayed so as to be stored as image data. This process sequence is stored in the formula editing sequence storage unit 5d, and the detailed sequence thereof is sequentially executed in the arithmetic unit 5a.

Figure 4:
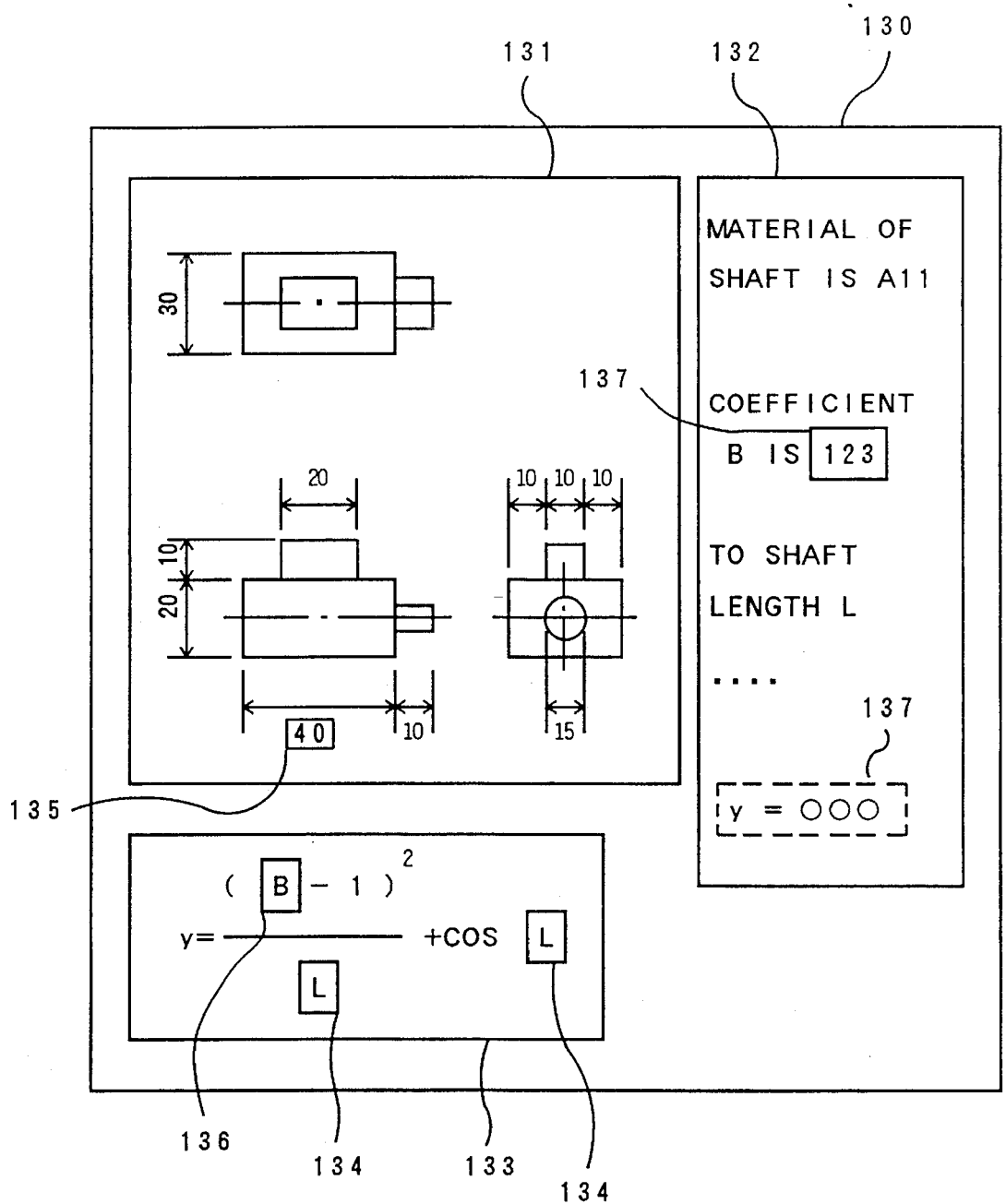
FIG. 4 is an explanatory diagram representing an example of the design document obtained in accordance with the preferred embodiment shown in FIG. 1.

FIG. 4 represents an example of a display screen with respect to information on a design document displayed on the display device 1. A drawing region 131 displayed on a display screen 130 corresponds to a region in which a shape and a size of an object to be designed have been drawn. Also, a character region 132 corresponds to a region in which a design specification has been described as a document. Furthermore, a formula input region (drawing region) 133 is a region for a calculation to evaluate the object to be designed based on the data of the size and design specification thereof.

FIG. 2 is a flowchart representing a process sequence for setting both the above-described drawing region and character region, for entering the document and drawing into the respective regions, and for setting a drawing region 133 into which a formula is inputted, if required. At a step A, the character region 132 and drawing region 131 are set on the display screen. A character (or document) is inputted into the character region 132 at a step B. The information described in the character region 132 has been formed at the step B by way of a character input/edit function of a wordprocessor. At a step C, a drawing is inputted into the drawing region 131. The information described in the drawing region 131 has been formed by arranging the drawing and character as a graphic element by this step C. Furthermore, steps D and E are steps for setting a region in which a formula constituted element is inputted as a graphic element. The information (shown in FIG. 4), which has been described in the formula input region 133 set by the step E, is formed by arranging the formula constructive element as the graphic element at the step F to enter an algebraic expression represented by a natural language.

Also in the above-described prior art, the formation of the entered formula is so constructed by successively arranging the operator, numeral value and the like in a so-called "one-dimensional character arrangement" within the character region, and therefore cannot be inputted based upon the formation of the algebraic expression represented in the natural language, which has been normally described in technical documents and leaflets such as a book of science and engineering, and a book of formulae. It should be noted that an algebraic expression is defined as a formula to combine either an algebraic quantity of 1 or more with an arithmetic symbol such as "+", "−", and "√", and also another symbol such as a bracket for indicating an arithmetic sequence. Also, the algebraic expression is mainly constructed of a rational integer formula containing a multinomial, a rational fractional formula, an irrational formula containing a roots symbol, an exponential formula, and a logarithmic formula. Further, this algebraic expression contains various functions such as trigonometric functions. To modify formula forms such as differential and also integral, numerical expressions containing differential symbols and integral symbols, for instance, d/dx and ∫ as an operator for one value are handled as algebraic formulae. For example, an algebraic formula (expressed by a natural language) for giving a variation "δ" with respect to an optimum designing matter for rigidness of a structure is expressed by:

$$\delta = \frac{Qd}{2AE\sin\theta\cos2\theta} \quad (1)$$

Another algebraic formula (expressed by a natural language) for obtaining a partial derivative with respect to "E" defined in the above Equation (1) is given as follows:

$$\frac{\partial \delta}{\partial E} = \frac{\partial}{\partial E}\left(\frac{Qd}{2AE\sin\theta\cos^2\theta}\right) \quad (2)$$

It should be noted that when the algebraic formula is inputted from a terminal so as to form a program, the above-described algebraic formulae (1) and (2) are inputted via the terminal with employment of the program language (for instance FORTRAN) as the following representation forms:

$$\delta = Q \times d/(2 \times A \times E \times \sin\theta \times (\cos\theta)^{**}2) \quad (3)$$

$$\partial/\partial E(\delta) = \partial/\partial E \, (Q \times d \,(2 \times A \times E \times \sin\theta \times (\cos\theta)^{**}2) \quad (4)$$

The first-mentioned algebraic formulae (1) and (2) have the same meanings as those of the last-mentioned algebraic formulae (3) and (4). However, in this case, the algebraic formulae (1) and (2), which can be originally recognized by any operators, must be inputted into a computer after being converted into the forms of the algebraic formulae (3) and (4). As a result, there is a problem that unwanted workloads, required for the above-described converting operations and also for preventing erroneous inputs, are increased. To avoid such problems, in accordance with this preferred embodiment, a program is formed based upon information (also information contained in design document) of an algebraic formula presented in real mathematical notation, by which the contents thereof may be readily understood by persons who have not mastered the program language, as will be described later.

FIG. 3 is a flowchart for explaining a process in which an algebraic formula is entered by arranging an operator, a symbol, a function and a numeral value as a graphic element; an execution result of the arithmetic process based upon the formula is displayed and then stored as graphic data.

At a step F, an arithmetic relationship among constituent elements of the formula is inputted by an operator by arranging the constituent elements as the graphic element on the display apparatus 1.

At a step G, an arithmetic processing program which may be processed in a computer is produced based upon the arithmetic relationship among the constituent elements of the formula.

At a step H, numerical values within the design document are derived as the input data to the above-described arithmetic processing program, and the arithmetic processing program is executed.

At a step I, an execution result of the arithmetic processing program is converted into a graphic form and a list form which will be then assembled into the design document.

Detailed contents of the processes defined at the respective steps F to I will now be successively explained in sequence from the step F to the step I.

Figure 5:
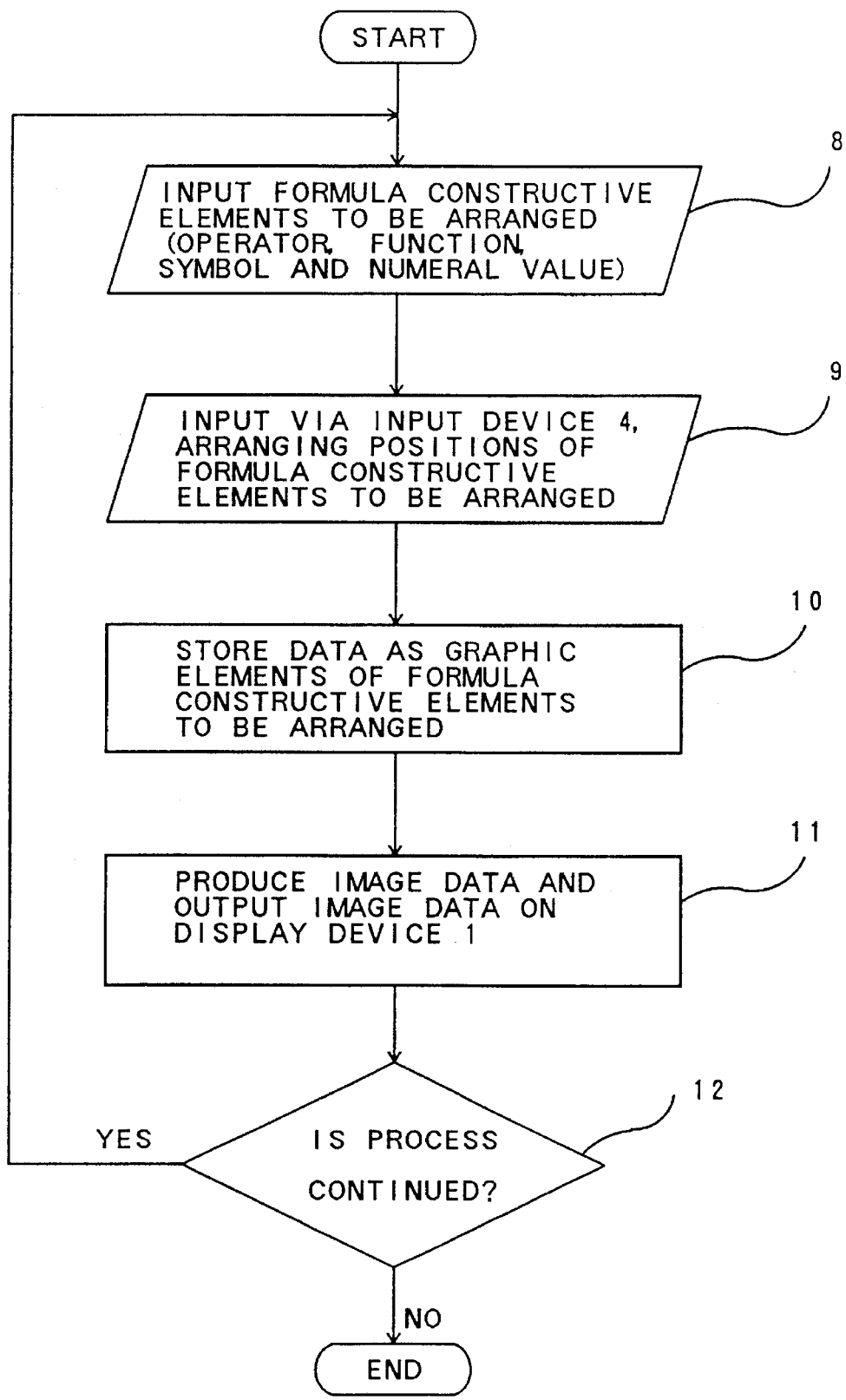
FIG. 5 is a flowchart explaining a detailed process sequence of the step "F" shown in FIG. 3.

FIG. 5 represents a flowchart for explaining the detailed process of the step F.

In the flowchart shown in FIG. 5, an operator inputs one of the formula constituent elements, such as an operator, a symbol, a function and numerical data, via the input device 4. These elements are to be arranged on the display screen of the display apparatus 1 at a step 8. The operator can freely select which element is first inputted therein from among a plurality of formula constituent elements for constructing the formulae. As the input device 4, for instance, a keyboard is utilized. Alternatively, there is a further possibility to employ an input device for directly designating characters, and also a position instructing device, so-called as a mouse and a stylus pen, so that the formula constituent elements to be arranged may be selected from the menu region displayed on the display screen.

At a step 9, the operator instructs via the input device 4, the positions of the formula constituent elements on the display screen, which have been entered at the step 8. The positions may be freely designated on the display screen so long as a predetermined positional relationship exists between the already arranged formula constituent elements and a formula constituent element to be arranged. Also at this step 8, a position designating device may be employed as the input device 4. This position designating device may be so constructed that a position which has been designated by displaying a graphic element, so-called as "a cursor" on the display screen, may be successively represented to the operator. Otherwise, the sequential display of the designated positions may be continuously performed while the operator gives an instruction to determine the positions via the input device 4. The positions of the relevant formula constituent elements on the display screen are grasped by way of a coordinate system of the display screen and then processed at a computer.

At a step 10, data as a graphic element with respect to the formula constituent element to be arranged is stored into the formula data storage device 7 based upon the position data designated at the step 9. A concrete processing content as well as detailed data as a graphic element of this step 10 will now be described with reference to FIG. 6.

At a step 11, based upon the data as the graphic elements related to the formula constituent elements which have been given at the above-described steps 8 to 10, image data, used for fixedly displaying the formula constituent elements inputted by the input device 4 on the display screen of the display device 1, is produced by utilizing the arithmetic unit 5a, and then is outputted via the image data output unit 5d, image data storage device 3, and image display control device 2 to the display device 1.

At a step 12, a determination is made of whether the formula forming process is to be continued or not. If a determination is made that the forming process is to be continued, the processes defined at the previous steps 8 to 11 are again executed, so that the formula constituent elements are inputted one by one. When the formation of formula performed on the display screen is accomplished, a determination result of "NO" is obtained at the step 12 under a predetermined condition, whereby the procedure to input the formula constituent elements is completed. It should be noted that an example of formula constituent elements will be described later.

Figure 6:
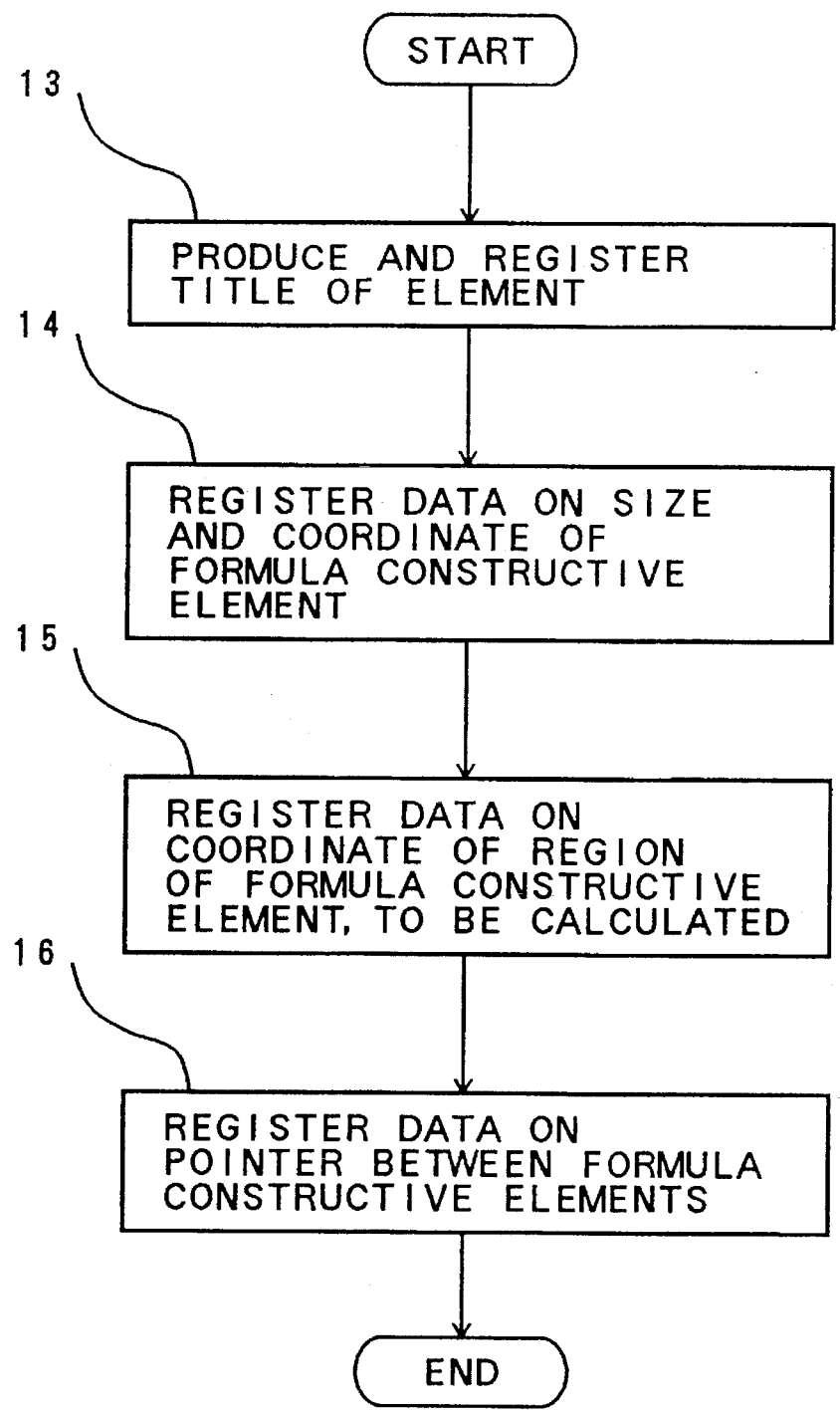
FIG. 6 is a flowchart representing a detailed process of the step 10 shown in FIG. 5.

Referring now to FIG. 6, the process defined at the step 10 will be described in more detail. A featured content of this preferred embodiment is reflected in the process of this step 10.

The step 10 is constructed of four steps 13 to 16. First, the formula constituent elements are entered via the input device 4 in order that these elements are arranged on the display screen of the display device 1 as the graphic elements. Furthermore, upon input of this arranging position information, titles of these elements are produced as the graphic elements in the arithmetic processing apparatus 5 and then registered (at a step 13). The element title is generated for every formula constituent element, so that the elements for constituting the formula may be discriminated from each other. Thereafter, there are registered both data representative of display information related to the arranging coordinate, and also data indicative of the size of the respective formula constituent elements (at a step 14). At steps 15 and 16, comparing (1) a coordinate of a region where the respective formula constituent elements are to be calculated with (2) coordinates of other formula constituent elements, both (3) a relationship of regions where other formula constituent elements contained in these regions to be calculated are calculated, and (4) a relationship of regions where other formula constituent elements are calculated utilizing the calculation results of the respective formula constituent elements, are registered. The above-explained description will now be detailed with reference to a concrete example. Assuming now that one formula is expressed as "A+cos (1−B)", and considering the function "cos" in this formula, the following information is given as the above-described items (1) to (4):

(1): a coordinate of a region containing a formula "1−B" within a bracket.

(2): coordinates of a subtraction operator "−", a numeral value of "1" and a symbol "B", which correspond to the constituent elements of the formula "1−B" within the bracket.

(3): a corresponding relationship between "cos" and an operator "−" in which the calculation result made by the subtraction operator "−" corresponding to the constituent element of the formula "1−B" within the bracket, becomes an argument of the function "cos".

(4): a corresponding function between an adding operator "+" in which the calculation result made by the function "cos" becomes the operand of the adding operator "+", and "cos".

It should be noted that it is an object to define a relationship among formula constituent elements, and to achieve this object there is employed a data structure having a list form for storing the mutually corresponding formula constituent elements with respect to each of the formula constituent elements, and this relationship will be referred to as a "pointer".

In FIGS. 7 to 13, there are shown examples for determining both arranging regions and regions to be calculated with regard to each of the formula constituent elements in a case in which the formula constituent elements, such as operators, symbols, functions and numerical values which are defined in this preferred embodiment, are displayed as the graphic elements on the display screen. FIGS. 14 to 20 represent data structures in list forms related to graphic elements corresponding to the formula constituent elements shown from FIG. 7 to FIG. 13.

Figure 7:
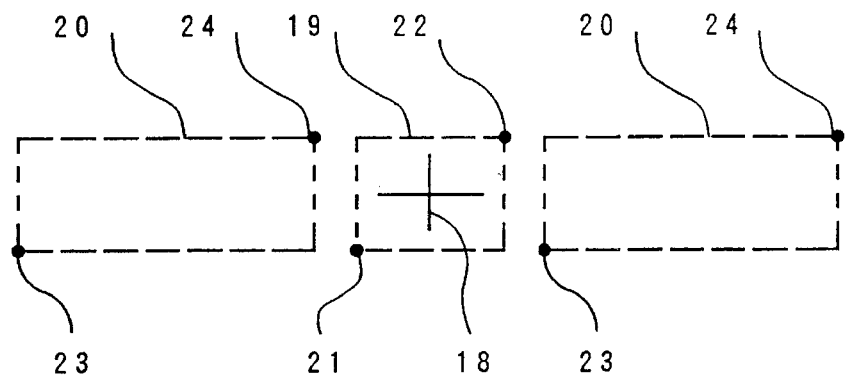
FIGS. 7 to 13 are explanatory diagrams showing display information as graphic elements of various formula constructive elements.

FIG. 7 indicates an adding operator as a formula constituent element 18. As the adding operator 18, a region 19 where the operator is arranged, and two regions 20, 20 to be calculated are positioned on both sides of the first region 19. Positions of the respective regions displayed on the display screen are displayed by the coordinates of points 21 and 22 with respect to the region to arrange the formula constituent element, and also by the coordinates of points 23, 23 and 24, 24 as to the regions 20, 20 to be calculated, by way of a combination of maximum values and also minimum values of the respective coordinates in two-dimensional X axis and Y axis.

FIG. 14 represents a data structure 25 in a list form related to the graphic elements of the above-described adding operator 18. This data structure 25 is formed within a predetermined area of the graphic element library storage device 6, and various types of data are stored in this storage device t5. As shown in FIG. 14, there are provided in the data structure 25, the respective items, i.e., a title 26 of graphic element; a title 27 of operator; a pointer 28, and coordinates 29. There are also provided columns corresponding to the respective items, into which the data are written. Every time a formula constituent element to be arranged is determined, this data structure 25 is called out, the titles of elements which are not duplicated with each other with respect to the respective formula constituent elements are allocated, the formula constituent elements are arranged as the graphic elements on the display screen, and furthermore both the arranging coordinates of the formula constituent elements and the arranging coordinates of the regions to be calculated are registered or stored as data in the formula data storage unit 7. The values of the above-described position coordinates are registered with employment of the coordinates of the formula constituent elements inputted in the input process defined at the step 9 by executing the process operation of the arithmetic processing device 5 as defined at the steps 13, 14 and 15. It should be noted that the titles of elements which are not duplicated with respect to these formula constituent elements may be produced on the basis of the numerical values which are automatically updated by the arithmetic processing device 5 every time the process of the step 13 is executed.

In the sample of the data structure for the adding operator shown in FIG. 14, the regions 20, 20 to be calculated are defined on both sides of this adding operator 18, and also data columns are formed as a right region and a left region at the respective columns of the pointer 28 and coordinate 25 on the data structure. It should be noted that the coordinates of the respective regions to be calculated may be constructed so as to be modified with the values which are designated by the input device 4 at the step 15 after arranging the formula constructive element.

Also, in the pointers contained in the data structure of the formula constituent elements, there are defined:

(1) pointers for other formula constituent elements contained in the respective regions to be calculated of this formula constituent element; and, (2) pointers for other formula constituent elements to which the region to be calculated belongs, and contains this formula constituent element. The data value of each pointer corresponds to a title of graphic element for another formula constituent element. Considering now the data structure of the adding operator 18 shown in FIG. 14, the pointer of the right region is so defined that it is connected to other formula constituent elements which correspond to the operators for giving the calculation result of the formula contained in the right-sided region of the operator "+". A pointer of the left region is similarly defined. Also, the pointer of the calculation result is so defined that this pointer is connected to other formula constituent elements to which the region to be calculated belongs and contains the adding operator "+". The data registration of pointers among the formula constituent elements is executed at the step 16. A detailed process of this step 16 will be discussed later.

Figure 8:
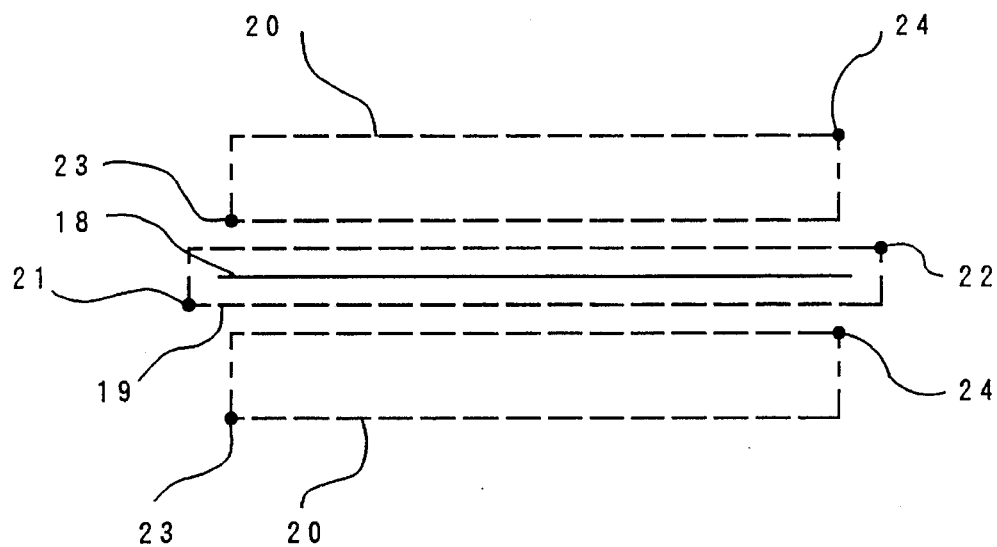
Figure 9:
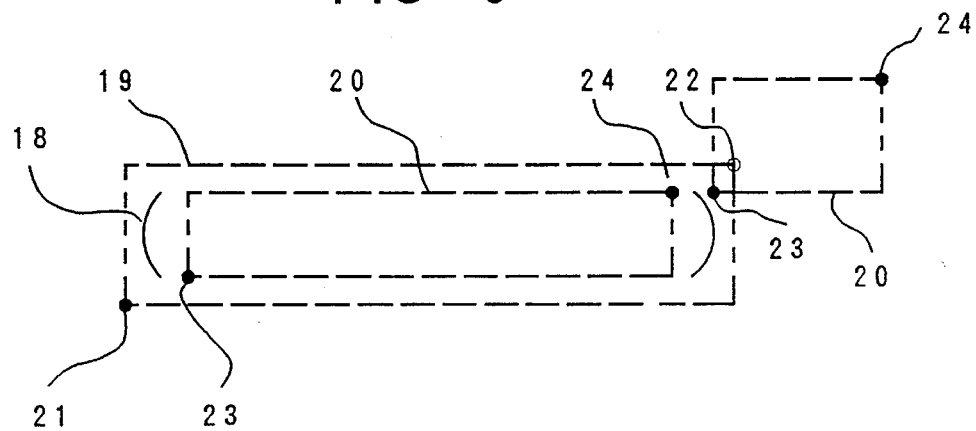
Figure 10:
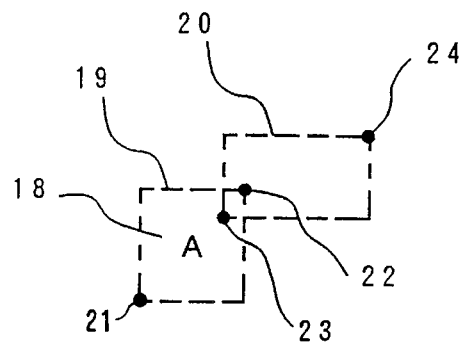
Figure 11:
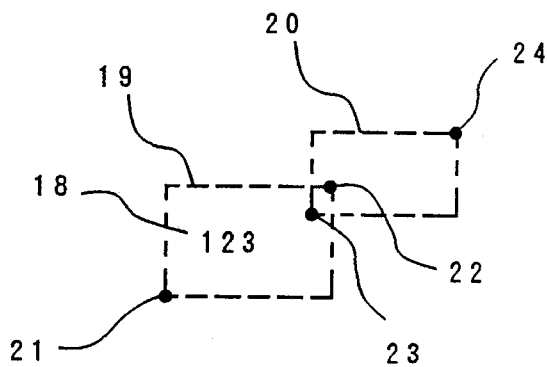
Figure 12:
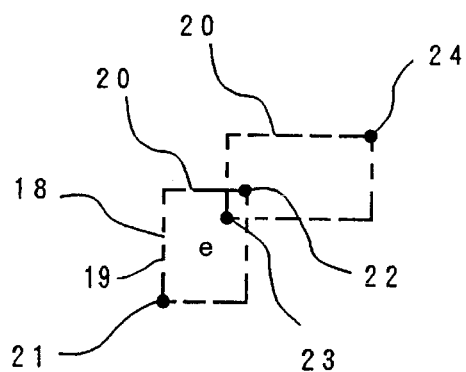
Figure 13:
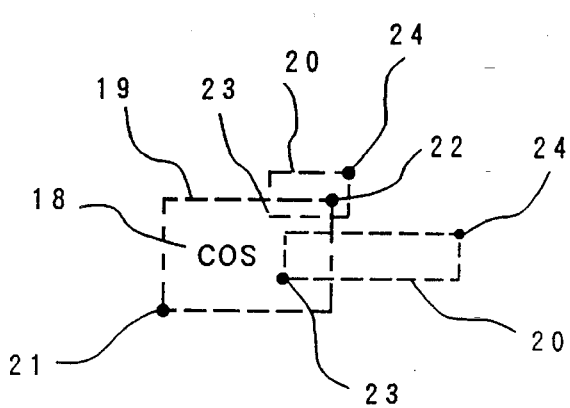

Similarly, there are represented as the formula constituent elements 18, a symbol of fraction in FIG. 8; a symbol of bracket in FIG. 9; a character symbol in FIG. 10; a numeral value in FIG. 11; an exponential function in FIG. 12; and a cosine function in FIG. 13, respectively. In the respective figures, both the arranging region 19 and region 20 to be calculated are defined with respect to these symbols and items, and furthermore points 21, 22, 23 and 24 for determining each of the regions are indicated. In FIGS. 15 through 20, there are shown data structures in list forms which correspond to these formula constituent elements, which is similar to that of FIG. 14. In FIG. 15, a data structure of a fractional symbol is shown. In FIG. 16, a data structure of a bracket symbol is represented. In FIG. 18, a data structure of a numeral value is indicated. In FIG. 19, a data structure of an exponential function is shown. Also, a data structure of a cosine function is shown in FIG. 20. As apparent from FIGS. 15 to 20, the content of the pointer 28 in each of these data structures, and also the content of the coordinate 29 related thereto are defined in accordance with the feature of the respective formula constituent elements.

Description will now be made of a detailed processing sequence for the step 16 from FIG. 6. The step 16 is accomplished by:

(1). A step of registering a pointer to other formula constituent elements contained in the region to be calculated for the inputted formula constituent element; and, (2). A step of registering a pointer to other formula constituent elements to which the region to be calculated belongs and which contains the inputted formula constituent elements. In the step 16, the above-explained two steps (1) and (2) are sequentially executed.

Figure 21:
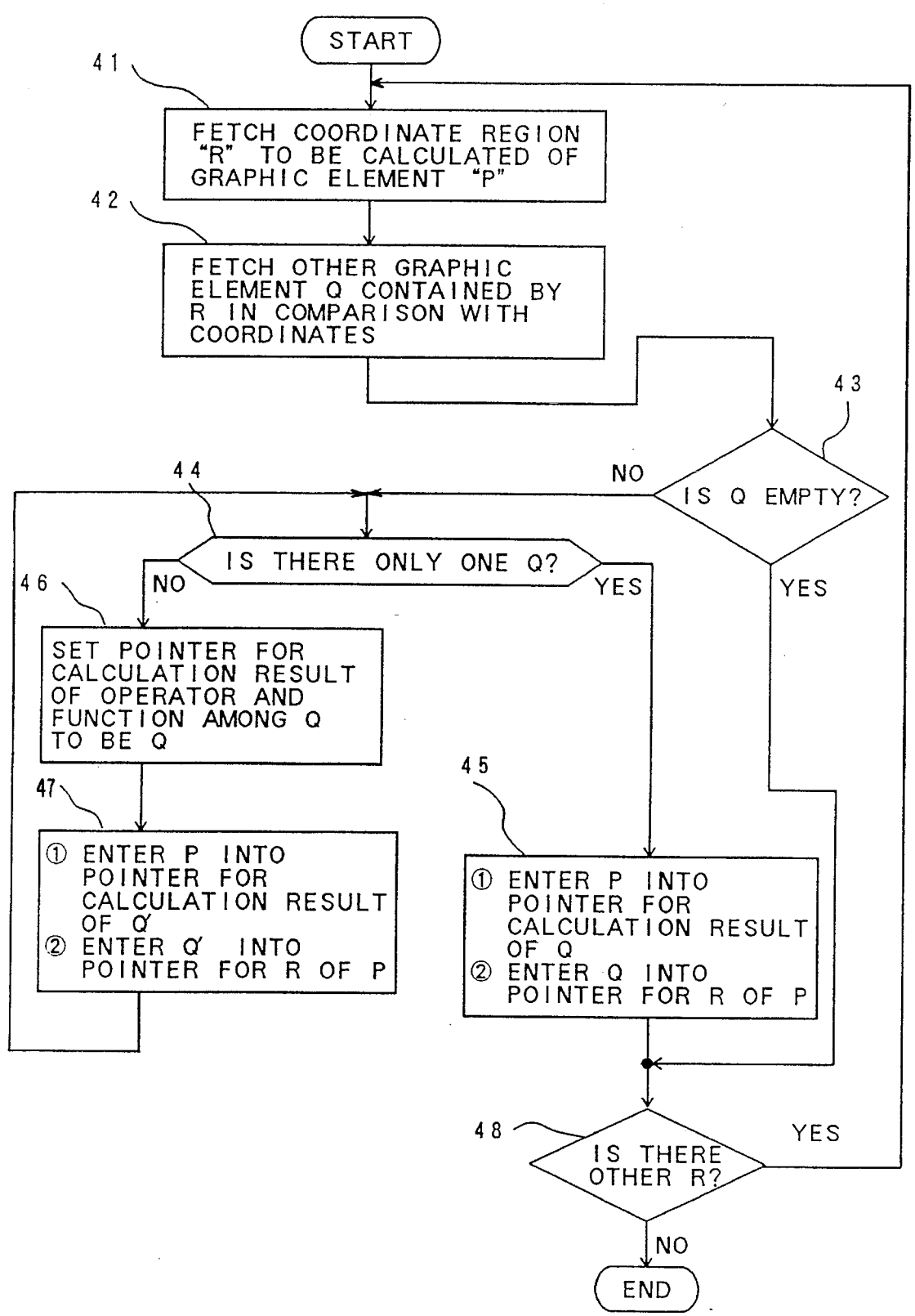
FIG. 21 is a flowchart representing a first pointer setting method used when data on the formula constructive element is formed.

FIG. 21 represents a process sequence performed in the above-described step (1), in which the pointer to the other formula constituent elements contained in the region to be calculated is stored into the formula data storage device 7.

First, at a step 41, both a region to be calculated of a graphic element (a certain formula constituent element) and a coordinate thereof, which are to be arranged on the display screen, are fetched. It should be noted that a graphic element is referred to as an "R". Next, at a step 42, another graphic element (another formula constituent element) Q contained in the region "R" to be calculated is fetched by performing the coordinate comparison. At a step 43, it is determined whether there is another graphic element "Q" contained in the region "R" to be calculated. If an empty is recognized, the process operations similar to those of the above-described steps are repeated via the step 48 as to another region "R" to be calculated of the graphic element "P".

In the case in which there is only one element of another graphic element Q contained in the region R to be calculated, at a step 45, (a) a graphic element "P" is entered into a value of a pointer for a calculation result of the graphic element Q; and, (b) the graphic element Q is entered into a value of a pointer for the region R to be calculated of the graphic element P.

On the other hand, in the case in which there are a plurality of other graphic elements contained in the region "R" to be calculated, an element where a value of a pointer of a calculation result has not yet been set is fetched at a step 46, and then is used as Q'. Thereafter, at a step 47, (c) the graphic element P is entered into a value of a pointer of a calculation result for the above-described graphic element Q'; and, (d) the graphic element Q' is entered into a value of a pointer of the region R to be calculated for the graphic element P.

After the above-described steps 45 and 47 have been completed, the process is returned to step 44 at which the above-described process is repeated.

Figure 22:
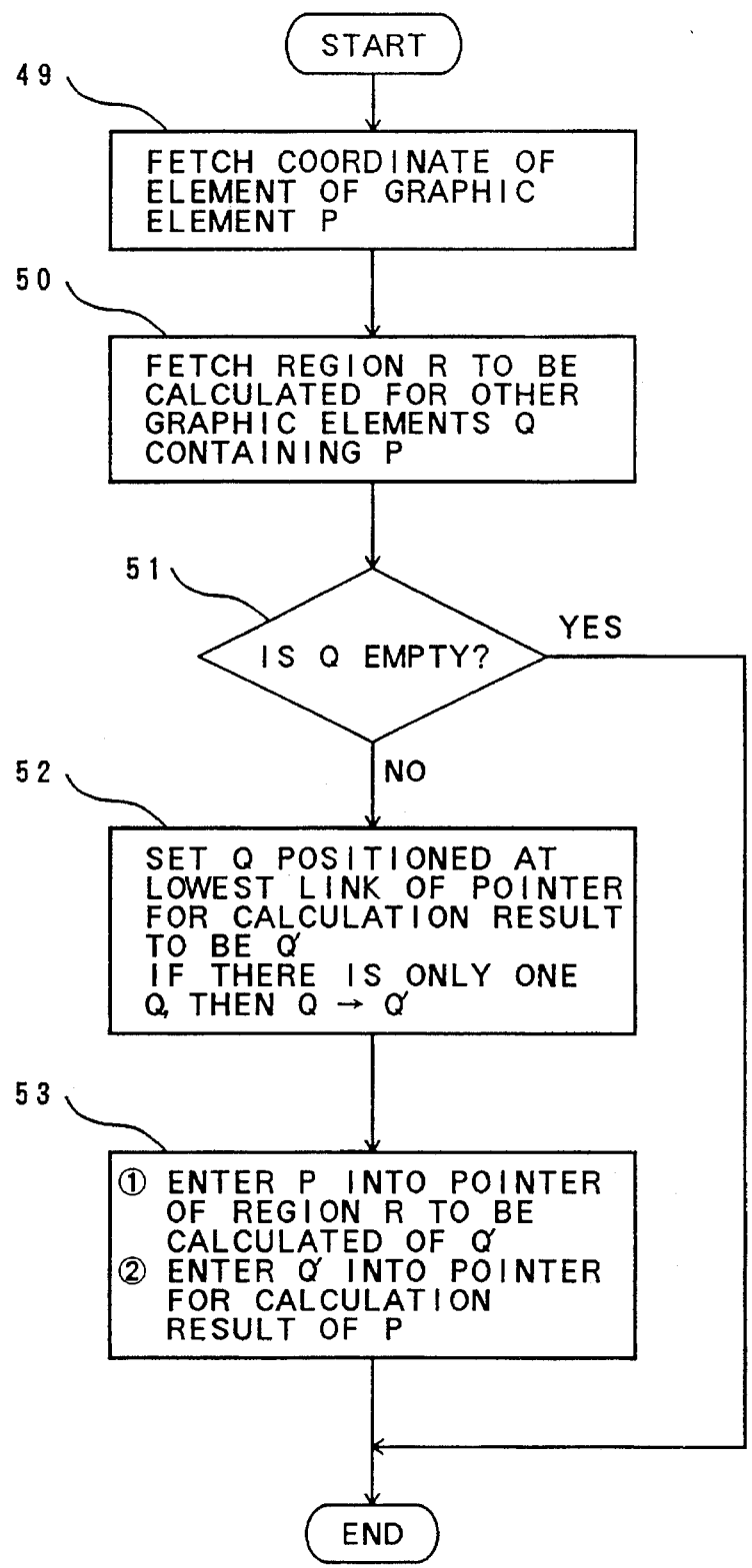
FIG. 22 is a flowchart indicating a second pointer setting method used when data on the formula constructive element is formed.

FIG. 22 represents a process sequence performed at the above step (2) for registering the pointer to other formula constituent elements to which the region to be calculated and containing the formula constituent elements belong.

At a first step 49, an arranging coordinate of a graphic element (a certain formula constituent element) to be arranged is fetched. This graphic element will now be referred to as "P". Next, at a step 50, the region R to be calculated, in which the graphic element "P" is contained, is fetched by way of the coordinates comparison, and then another graphic element Q (another formula constituent element) to which the region R to be calculated belongs is obtained. Here, a determination is made at a step 51 of whether or not there exists the region R to be calculated, into which the graphic element P is contained, and the process is ended if there is no region R to be calculated.

On the other hand, if there is the region "R" to be calculated, the process is advanced to a step 52. At this step 52, in the case in which there are plural graphic elements Q to which the region R to be calculated belongs and which contain the graphic element P, the graphic element "Q" which does not contain the region R to be calculated is selected, and it will be referred to as a "Q'".

At a final step 53, (e). the graphic element P is entered into a value of a pointer for the region R to be calculated with respect to the graphic element Q', (f). the graphic element Q' is entered into a value of a pointer for a calculation result of the graphic element P.

The data which have been obtained by the above-described process sequence may be directly utilized in a sequence for forming a graph by which an arithmetic relationship such as an operator, a symbol, a function and a numeral value corresponding to the formula constituent elements is given, with reference to the values of the pointers of the graphic elements.

Subsequently, a concrete explanation will now be made to describe how both the display screen of the display device 1 and data structures are transferred, with employment of an example where a simple formula is inputted in accordance with the above-described process sequence.

In this example, consideration will now be made such that an algebraic formula represented by a natural language is inputted:

$$A = \frac{(B-1)^2}{10} + \cos D$$

Figure 23:
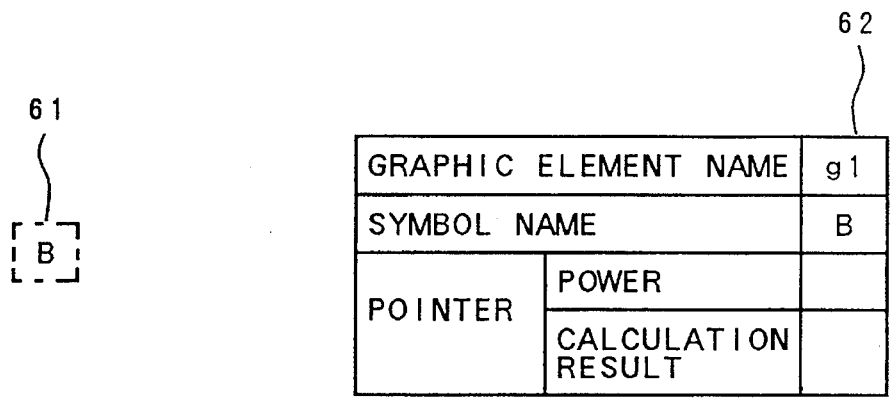

In FIG. 23, there is shown an indication 61 and a data structure 62 displayed on a display screen where a symbol "B" corresponding to the formula constituent element has been arranged. A block indicated by a broken line represents a region to be calculated. When the symbol B corresponding to the formula constituent element is inputted by the input device 4 (at the previous step 8) and also information on a position thereof is entered in the form of a coordinate (at the step 9), the data structure 62 is produced with the symbol name B by means of the arithmetic processing apparatus 5 and the like, and the graphic element name "g1" is stored (at the step 10), and furthermore the symbol B is displayed on the display screen of the display device 1 (at the step 11). Since other graphic elements (formula constituent elements) which have been previously arranged are not present on the display screen at this stage, no pointer having "power" and "calculation result" is set. In the figures after FIG. 23, for the sake of explanation, the data structure of the graphic element will be described while omitting a part of coordinate 24 related to the position.

Figure 24:
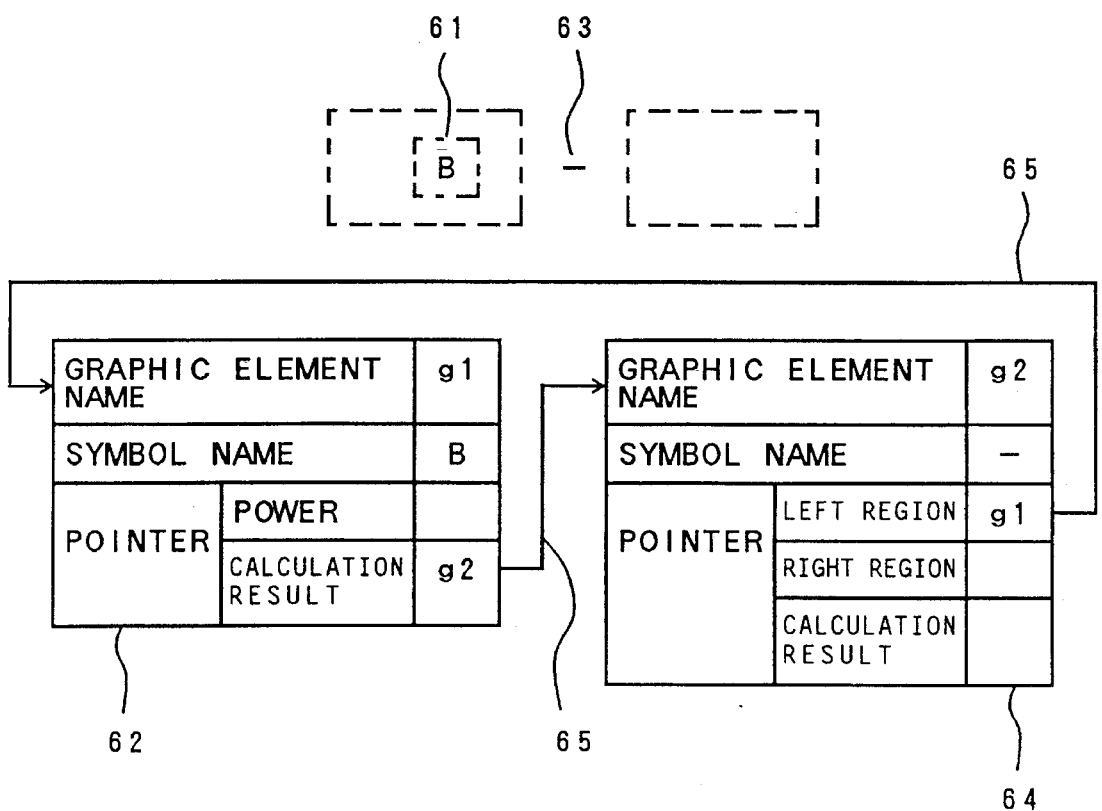

In FIG. 24, there are represented an indication 63 where the subtraction operator "−" corresponding to the formula constituent element has been additionally arranged on the display screen and also variations in the data structure. When the subtraction operator "−" is entered and the position thereof is entered, a data structure 64 of a graphic element name g2 indicative of the subtraction operator "−" is produced, and also the subtraction operator is displayed on the screen, which is similar to the above-described operation. In this case, "g1" is set to a pointer of "a left region" in the region of g2 to be calculated. This pointer corresponds to the pointer which has been set at the step 45 as a result of comparison between the left region of g2 and the coordinate of g1 at the previous steps 41 and 42. It should be noted that since there are neither other formula constituent elements contained in the right region of g2 nor other formula constituent elements containing the graphic element name g2, both the "right region" of this name g2 and the pointer for "calculation results" are not set. In FIG. 24, an arrow 65 indicates a connecting relationship between the data structures 62 and 64. The connecting relationships are similarly denoted in the following drawings.

Figure 25:
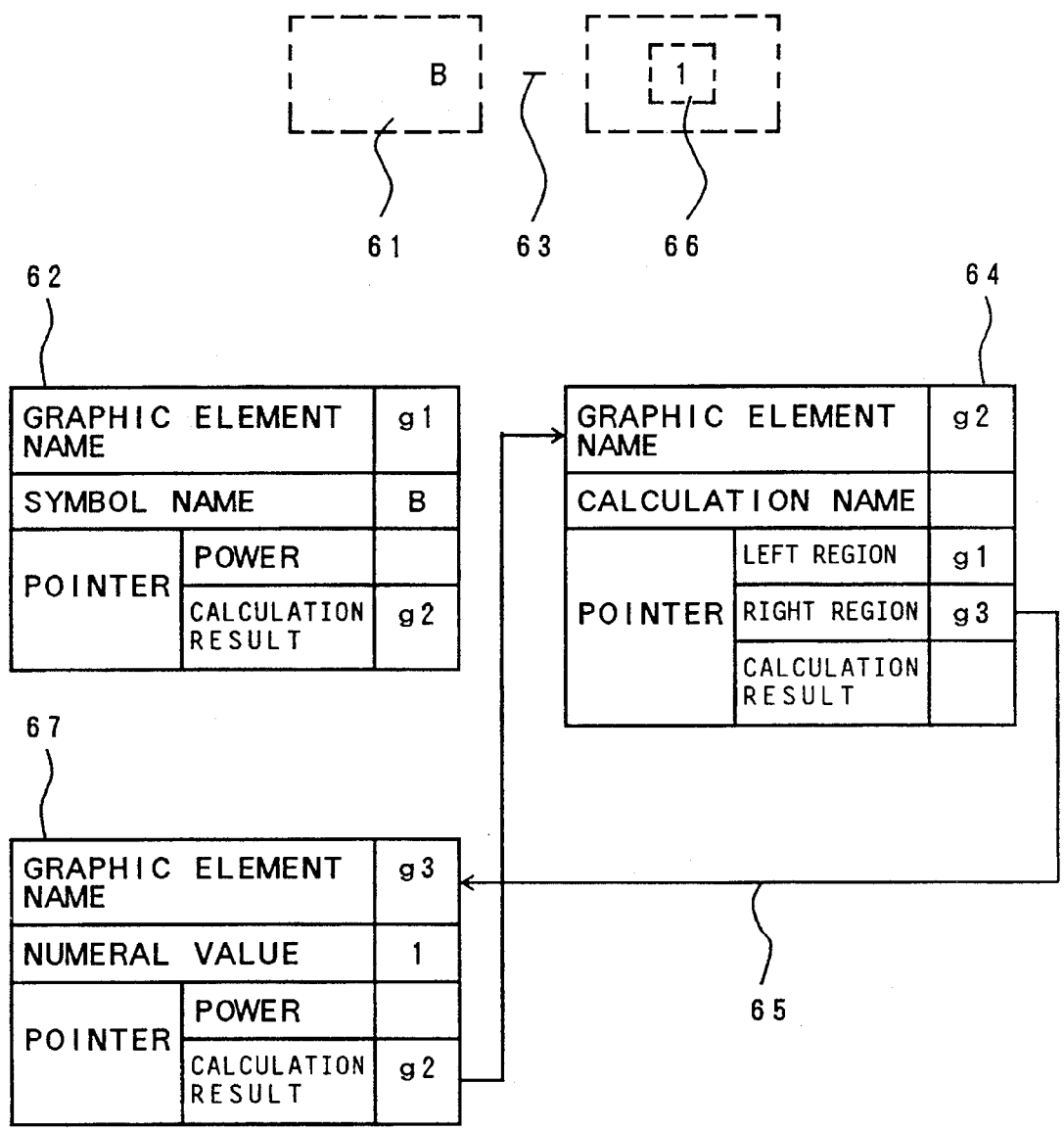

In FIG. 25, there is shown an indication 66 where a numeral value of 1 has been additionally arranged as the formula constituent element on the display screen, and also variations in data structures connected thereto. Similarly, when the numeral value of 1 is inputted and the position thereof is entered, a data structure 67 of a graphic element name "g3" indicative of the numeral value of 1 is produced, and thus the numeral value of 1 is represented on the display screen. In this case, the graphic element name "g2" is set to a pointer for a "calculation result" of the name g3, whereas the name g3 is set to another pointer of a "right region" in the region of the name g2 to be calculated. These pointers correspond to those set in the step 53 as a result of comparison between the right region of the name g2 and the coordinate of the name g3 at the steps 49 and 50.

Figure 26:
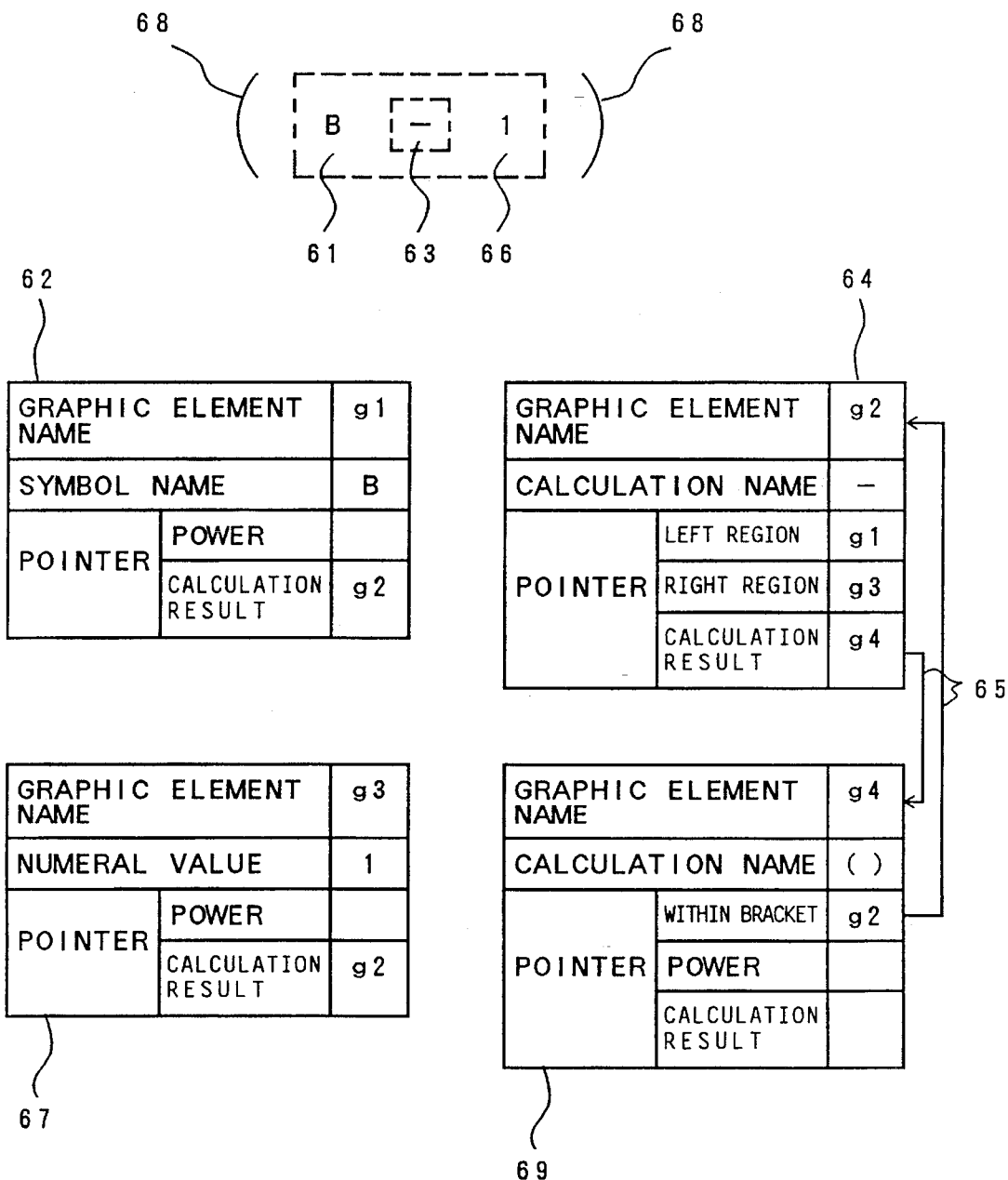

FIG. 26 represents that an indication 68 in which a bracket symbol as the numeral value constituent element has been additionally arranged on the display screen, and variations in data structures related thereto. When a bracket is entered and the position thereof is inputted, a data structure 69 of a graphic element name "g4" indicative of the bracket is produced, and the bracket 68 is represented on the display screen, which is similar to the previous case. In this case, the graphic element name g4 is set to the pointer of the calculation result of the name g2, and also the name g2 is set to the pointer "within the bracket" in the region of g4 to be calculated. These pointers correspond to those set in the step 47 after comparing the region of g4 to be calculated within the bracket with the coordinate of the name g2 at the previous steps 41 and 42.

Figure 27:
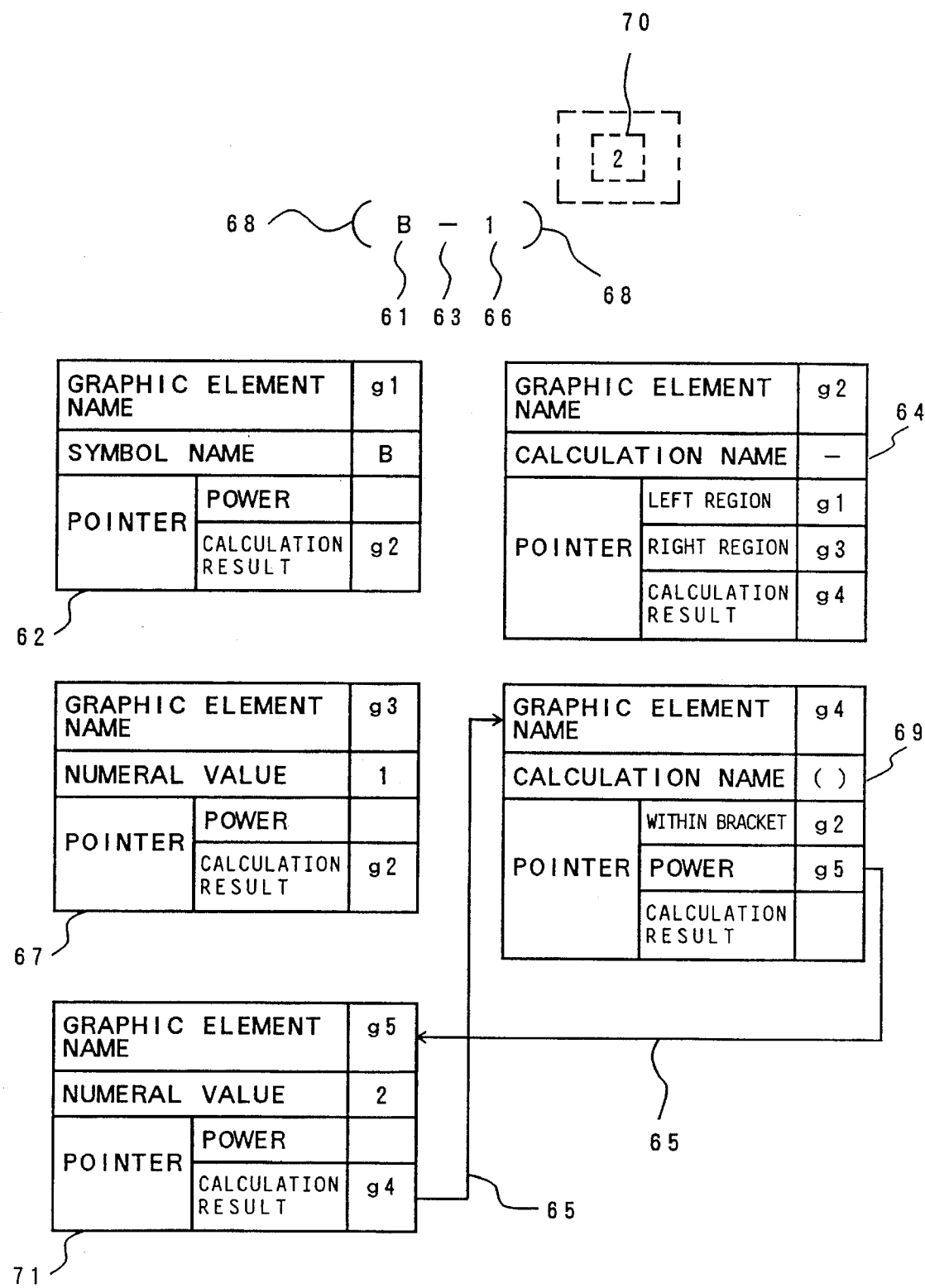

Subsequently, FIG. 27 represents an indication 70 in which a numeral value of 2 as the numeral value constituent element has been additionally arranged on the screen, and also variations in data structures related thereto. When the numeral value of 2 is inputted and the position thereof is entered, a data structure 71 of a graphic element name "g5" representative of the numeral value of 2 is produced, and also the numeral value of 2 is displayed on the display screen. In this case, the element name g4 is set into a pointer of "a calculation result" for the element name g5, and also the element name g5 is set to a pointer of "power" in the region of the name g4 to be calculated. These pointers have been set at the step 53 as a result of comparison between the region of "power" to be calculated for the graphic element name g4 and the coordinate of the graphic element name g5.

Figure 28:
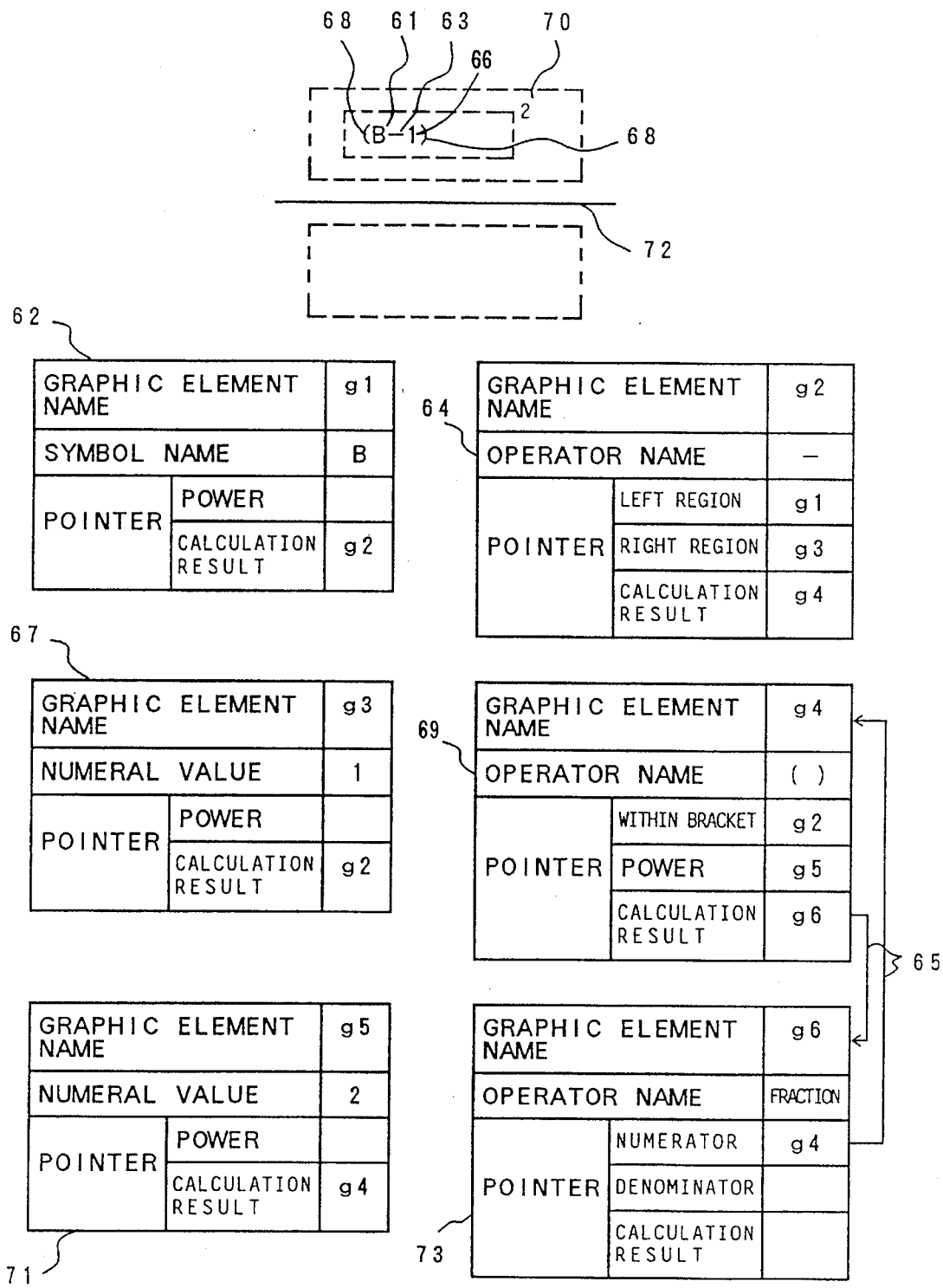

In FIG. 28, there are shown a representation 72 in which a fraction as the numeral value constituent element has been additionally arranged on the display screen and changes in data structures related therewith. When the fraction is inputted and then the position thereof is inputted, a data structure 73 of a graphic element name g6 indicative of the fraction is produced so that a fraction symbol is displayed on the display screen. In this case, the graphic element name g6 is set to a pointer for a "calculation result" of the name g4, whereas the graphic element name "g4" is set to a pointer of the "fraction" within the region of the element name g6 to be calculated. These pointers have been set at the step 47 as a result of comparing the region of the fraction to be calculated for the graphic element name g6 with the element name g4 at the steps 41 and 42.

Figure 29:
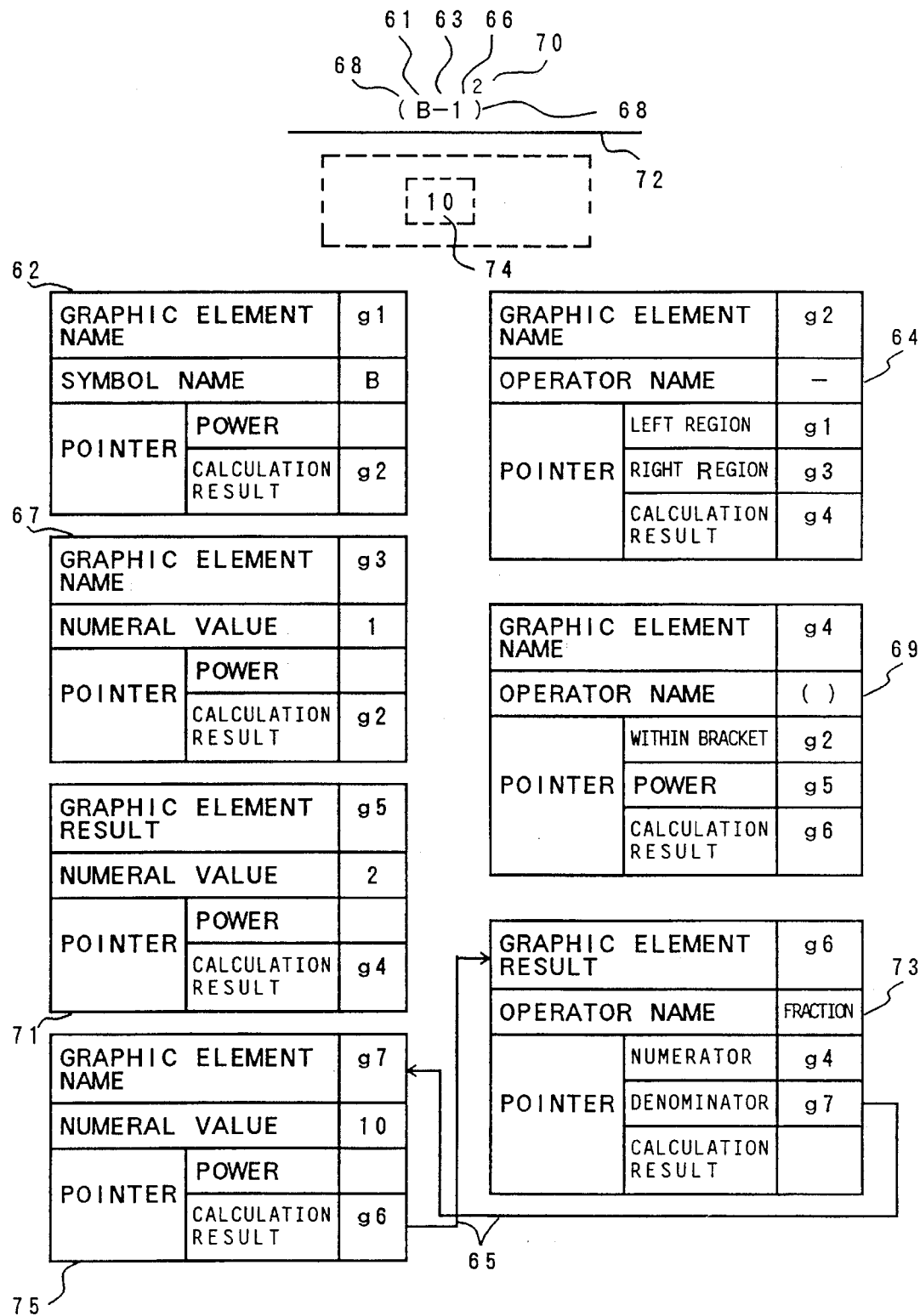

In FIG. 29, then there are shown an indication 74 where a numeral value of 10 as the formula constituent element has been additionally arranged on the display screen, and also variations in data structures connected thereto. When the value of 10 is entered and the position thereof is inputted, which is similar to the previous operation, a data structure 75 of a graphic element name g7 indicative of the numeral value 10 is produced, and the numeral value 10 is displayed on the display screen. In this case, the graphic element name g6 is set to a pointer for "a calculation result" of the name g7, whereas the graphic element name g7 is set to a pointer for "a denominator" within the region of the name g6 to be calculated. These pointers correspond to those set at the step 53 as a result of comparison between the region of the "denominator" to be calculated for the graphic element name g6 and the coordinate of the name g7 at the steps 49 and 50.

Figure 30:
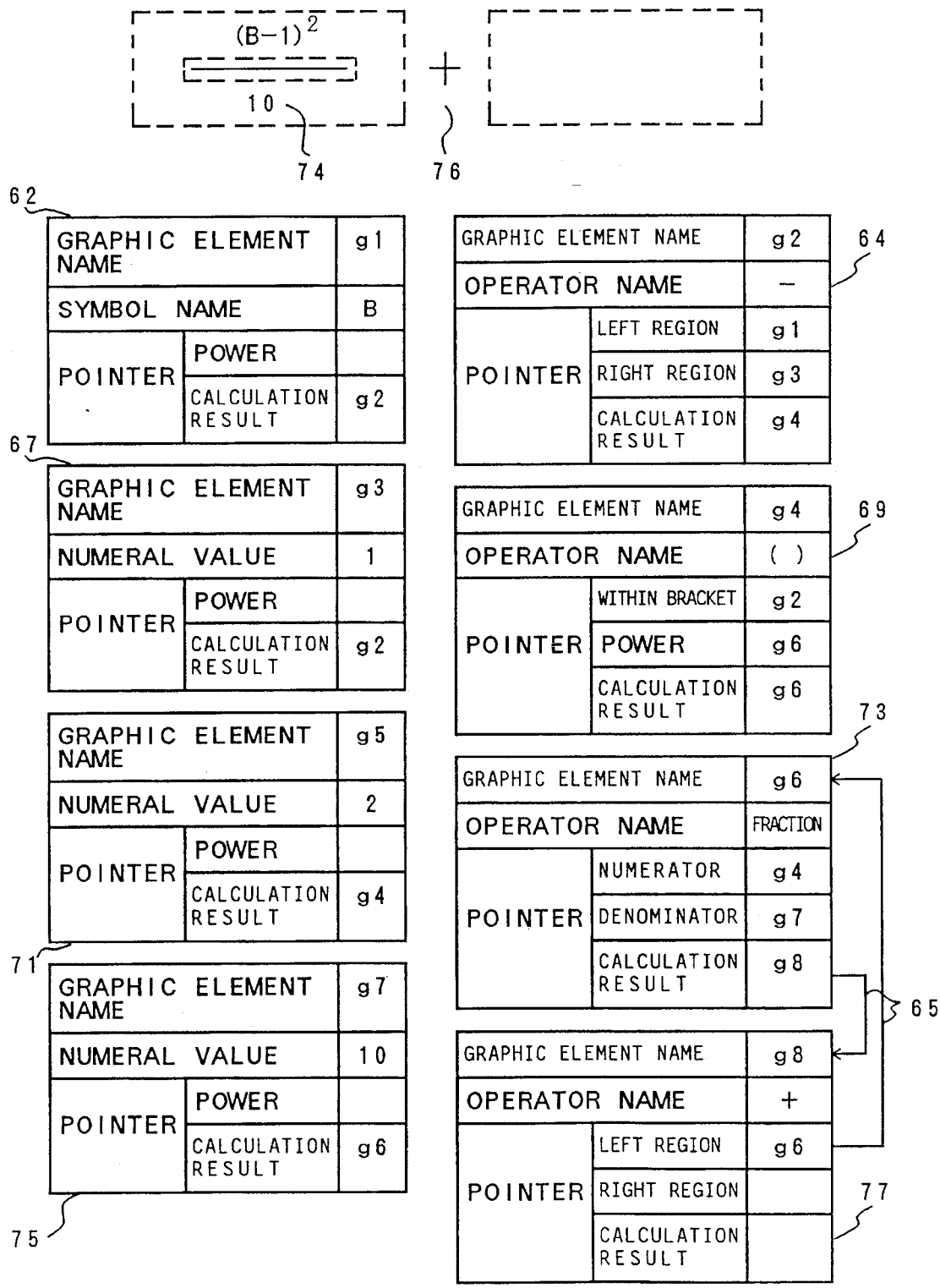

Next, there are shown in FIG. 30 both an indication 76 where an addition operation symbol "+" as the formula constituent element has been additionally arranged on the screen, and variations in data structures related thereto. When the adding operator "+" is inputted and also the position thereof is inputted, which is similar to that of the previous operation, a data structure 77 for a graphic element name g8 indicative of the adding operator "+" is produced, and furthermore the adding operator "+" is represented on the display screen. In this case, the graphic element name g8 is set to a pointer for a "calculation result" of the element name g6, and also the graphic element name g6 is set into a pointer for a "left region" within the region of the name g8 to be calculated. These pointers are those set at the step 47 as a result of comparing the region of a "left region" to be calculated for the graphic element name g8 with the coordinate of the graphic element name g6 at the steps 41 and 42.

Then, there are shown in FIG. 31, both an indication 78 where a trigonometric function "cos" as the formula constituent element has been additionally arranged on the display screen, and also changes in data structures connected thereto. Upon entry of the trigonometric function "cos" and also the position thereof, a data structure 79 of a graphic element name "g9," indicative of the trigonometric function "cos," is generated, and also a trigonometric function 78 is displayed on the display screen. In this case, the graphic element name g8 is set to a pointer for a calculation result of the graphic element name g9, whereas the graphic element name g9 is set to a pointer for a "right region" within the region for the graphic element name g8 to be calculated. These pointers have been set at the step 53 as a result of comparison between the region to be calculated for the "right region" of the graphic element name g8 and the coordinate of the graphic element name.

In FIG. 32, there are shown a representation 80 where a symbol "D" as the formula constituent element has been additionally arranged on the display screen and also changes in data structures related thereto. When the symbol D is entered and the position thereof is inputted, which is similar to that of the previous operation, a data structure 81 of a graphic element name g10 representative of the symbol D is produced and also the symbol D is displayed on the screen. In this case, the graphic element name g9 is set to a pointer for a "calculation result" of the graphic element name g10, and further the graphic element name g10 is set to a pointer for an "argument" in the region to be calculated for the graphic element name g10. These pointers have been set at the step 53 by comparing the coordinate of the graphic element result with the region of the "argument" to be calculated for the graphic element name g9 at the steps 49 and 50.

In FIG. 33, there are shown an indication 82 where an equality "=" as the formula constituent element has been additionally arranged on the screen and variations in data structures related thereof. When the equality "=" is entered and the position thereof is inputted, a data structure 83 of a graphic element name g11 representing the equality "=" is generated, and also the equality 82 is displayed on the display screen. In this case, the graphic element name g11 is set to a pointer for a "calculation result" of the graphic element name g8, and then the graphic element name g8 is set to a pointer for a "right hand" within the region of the element name g11 to be calculated. These pointers have been set at the step 47 as a result of comparing the coordinate of the graphic element name g8 with the region of the "right hand" to be calculated for the graphic element name g11 at the steps 41 and 42.

Finally, there are shown in FIG. 34, both an indication 84 where a symbol "A" as the formula constituent element has been additionally arranged on the display screen and changes in data structures related thereto. When the symbol "A" is inputted and the position thereof is entered, which is similar to that of the previous operation, a data structure 85 of a graphic element name g12 representative of the symbol "A" is generated, and also the symbol "A" is displayed on the display screen. In this case, the graphic element name g11 is set into a pointer for "a calculation result" of the graphic element name g12, and also the graphic element name g11 is set into a pointer for a "left hand" within the region to be calculated for the graphic element name g12. These pointers correspond to those at the step 53 as a result of comparing the coordinate of the graphic element name g12 with the region of a "left hand" to be calculated at the steps 49 and 50.

Figure 35:
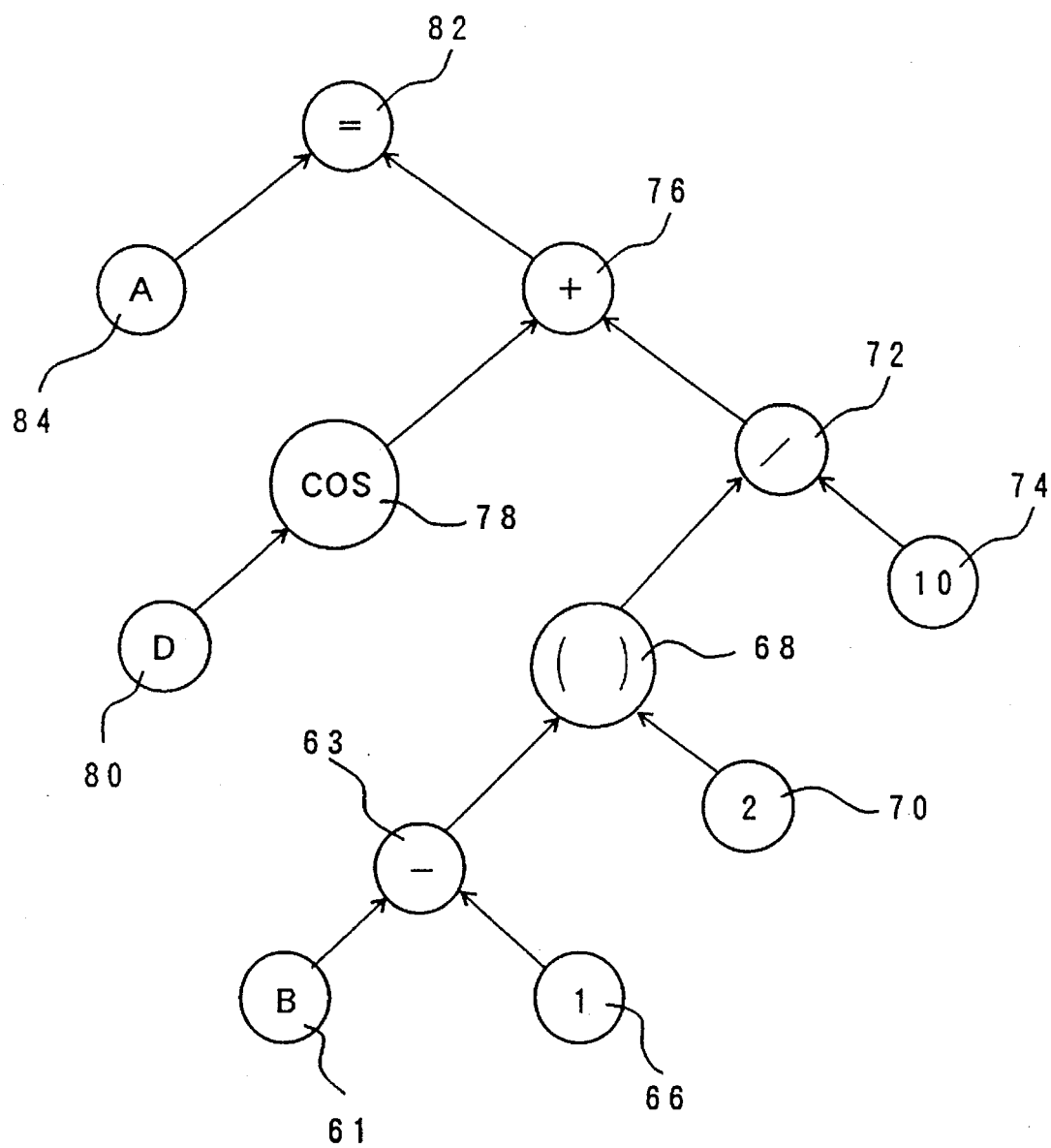
FIG. 35 is a graphic representation of the respective formula constructive elements for formulae which have been explained in the above-described preferred embodiment.

The data structures of the respective formula constructive elements which have been obtained in accordance with the above-described sequences are stored in the storage device 7 under such a condition in combination with the pointers and coordinates. As represented in FIG. 35, a graphic representation is formed which may give the arithmetic relationships among the operators, symbols, and numeral values and the like to constitute the formulae by retrieving the pointers of the data on the formula constituent elements obtained in accordance with the above-described sequences. The graphic representation shown in FIG. 35 corresponds to a directed branch in which the symbol and numeral value for constituting the formula are employed as a starting point, whereas the operator and function are used as an ending point. Particularly, in this example, the graphic representation is so constructed that numeral values of 1, 2 and 10 are used as a starting point whereas the operator "=" is employed as an ending point. It should be noted in FIG. 35 that the same reference numerals are employed as those denoting the same formula constituent elements described above with respect to the formula constituent elements positioning at the respective nodes of the graphic representation. The data having such a graphic form may be directly employed as the inputs for the below-mentioned processing operations:

(i) Formula processing operations such as factoring and derivation of formulae.
(ii) Formula calculations by substituting symbols by numeral values and by evaluating operators.
(iii) Block diagram representation of formulae, and conversion into computer programs.

As is apparent from the foregoing descriptions, there are provided the following advantages in accordance with the step F.

That is to say, to enter a formula into an interactive mode computer under a calculation executable condition, an operator will handle this formula as a graphic form and also handle a formula constituent element as a graphic element so as to write the formula on the display screen. As a result, the formula may be directly inputted into the computer, and an easy formula input operation may be employed, whereby the formula entry may be performed at a higher efficiency, and furthermore erroneous formula input may be prevented.

Since the arithmetic relationship of the formula constituent elements may be obtained on the basis of the position relationship among the sorts of formula constituent elements and the formula constituent elements on the display screen, there is no necessity to input a formula as character series data, so that the formula entry operation may be readily achieved and higher operabilities may be realized.

Also, since there is no necessity to discriminate/classify the formula constituent elements at a side of a computer and to analyze compositions, easy process operation may be achieved and therefore the total amount of computation may be reduced.

Since an operator intentionally and merely enters the formula constituent elements as the graphic elements so as to only write these constituent elements on the display screen, so that there is obtained the arithmetic relationships between the formula constituent elements which have been automatically inputted/arranged and the formula constituent elements which have already been arranged on the display screen, the formula constituent elements are written in an arbitrary writing sequence into arbitrary positions on the display screen to form the formula, whereby extremely high operabilities may be realized with easy operations. This effect is emphasized when a very complex formula is written.

Furthermore, in accordance with a computer system with employment of the above-described formula input processing apparatus and also a computer system to which the above-described formula input processing method has been applied, easy formula entry may be achieved.

In addition, the data indicative of the arithmetic relationships among the operators, symbols, functions, and numeral values for constituting the formula is automatically formed by arranging, via the input device, the graphic elements representative of the operators, symbols, functions and numeral values constituting the formula to indicate the sort thereof at the position arbitrarily designated by the operator on the graphic display screen. Then, the formed data may be directly utilized in such various processing operations, i.e., conversion process from the formula into the computer program, modification of the formula, and derivation of the formula.

As another preferred embodiment of the above-described step "F", there is a method for processing formula entries in which data related to a formula which has been once inputted and stored into the formula data storage device is fetched and is intended to be corrected. As to this data correction operation, there are conceivable four operations: (1) addition, (2) deletion, (3) duplication, and (4) correction (substitution).

With respect to the above-explained addition operation, a coordinate of a formula constituent element and also a coordinate of a region to be calculated contained in data on the fetched formula are corrected, and further the process sequence similar to such a case that the formula is newly entered may be directly applied.

As to the above-described correction operation, a title of an operator, a numeral value, and a symbol name within a data structure of a formula constituent element are corrected. It should be noted that an input operation for designating a title may be arranged by inputting a character series and a numeral value and the like via the input device 4 with respect to the formula constituent element designated via the input device 4 by an operator.

Furthermore, in accordance with the above-described deletion operation, the formula constituent element to be deleted is designated from the data, and other formula constituent elements connected with pointers other than a "calculation result" of this formula constituent element are wholly deleted.

Finally, in the above-explained duplication (copy) operation, a user designates a range for a formula to be duplicated on a display screen; the formula constituent elements contained in this range are fetched by way of the coordinate comparison; data on new formula constituent elements corresponding to these formula constituent elements are produced; and the connection state of the pointers among the formula constituent elements to be duplicated (copied) is transferred to duplicated (copied) data and registered. The copied coordinate data on the formula constituent elements is determined on the basis of a result made by designating a new arranging point via the input device 4 by the user. It should be understood that the pointer for the "calculation result" of the formula constituent elements by which the calculation result of the formula contained in the copying range, may be set in accordance with the above-described processes defined at the steps 49, 50, 51, 52 and the like by comparing the positional coordinate of the duplicated formula constituent elements with the coordinate of the region to be calculated for other previously arranged formula constituent elements.

In accordance with the above-described preferred embodiment, there is a particular merit that while entering the formula, the data on the previously formed formula is referred and corrected, whereby both the amount of data to be inputted and amount of operation required may be reduced. Furthermore, there is another effect that erroneous formula input operation may be prevented during the correction operation by maintaining the matching characteristics of the formula data before and after the correction.

Furthermore, in the step G of this preferred embodiment, on the basis of the arithmetic relationship of the formula, a computer program for calculating the values of the formula is produced. Description will now be made of the step "G" with employment of the arithmetic relationship for the formulae represented in the graphic representation of FIG. 35.

Figure 36:
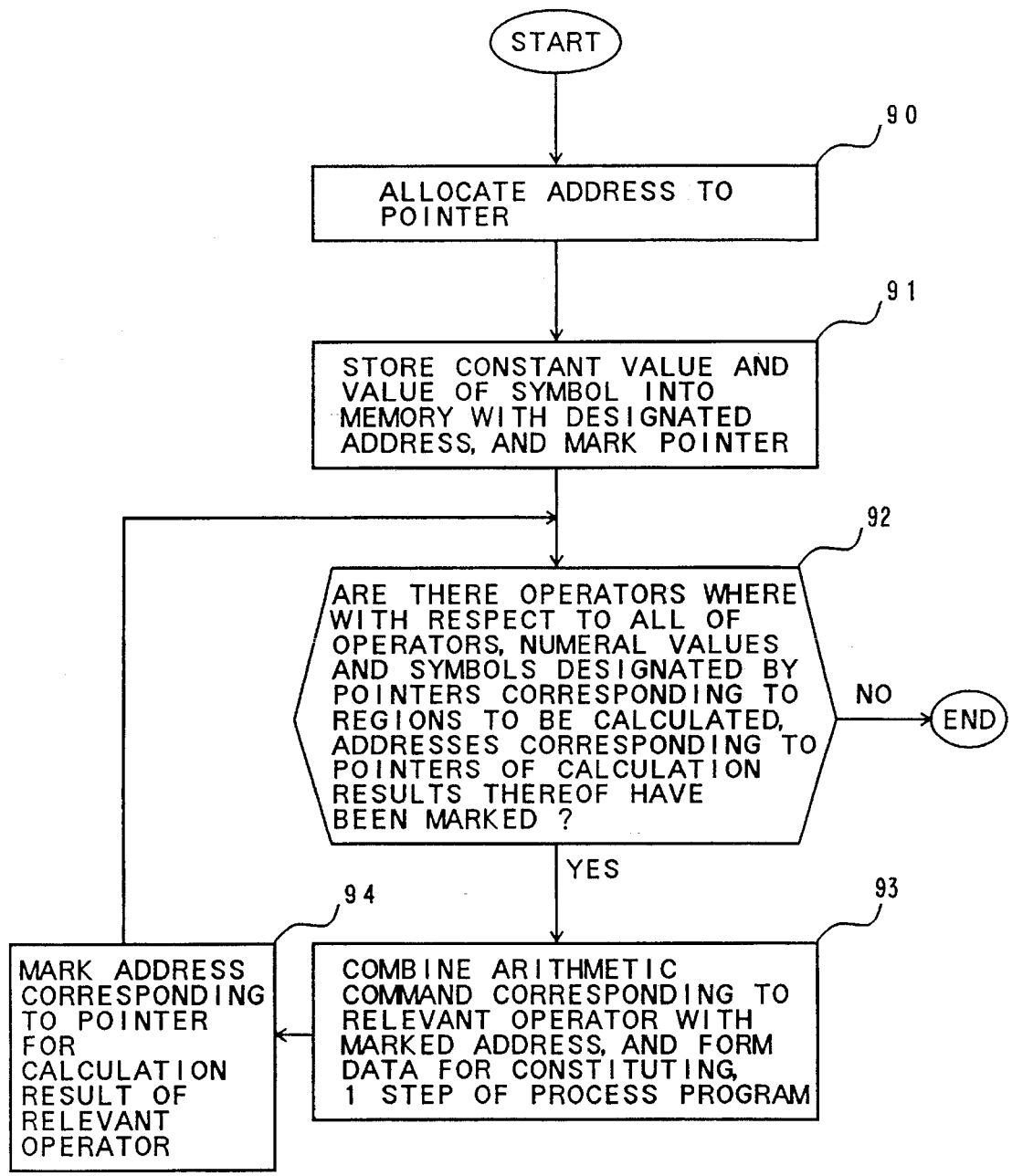
FIG. 36 is a flowchart explaining a detailed process sequence of the step "G" defined in FIG. 3.

In FIG. 36, there is shown a flowchart for explaining a detailed processing sequence defined at the step "G". According to the basic idea of this process operation, an operator is retrieved from the starting node of the graphic representation, values which have been determined as the inputs of the operator are successively converted into arithmetic commands, and then are stored as one step of the program.

At a first step 90, addresses of the respective memories within the data storage region with respect to the memories for storing the computer program are allocated in accordance with a pointer for a calculation result of each constituent element for a formula. In the graphic representation shown in FIG. 32, the directed branches for coupling the nodes of this graphic representation correspond to the pointers for the calculation results, and then addresses of memories for storing therein the numeral values corresponding to the calculation results of the operators, which become the starting point of the directed branches, are allocated to the respective pointers.

Subsequently, at a step 91, one step of such a program having arithmetic instructions for storing the numeral values and values of symbols into the memories, which correspond to the starting nodes of this graphic representation, is formed.

Figure 37:
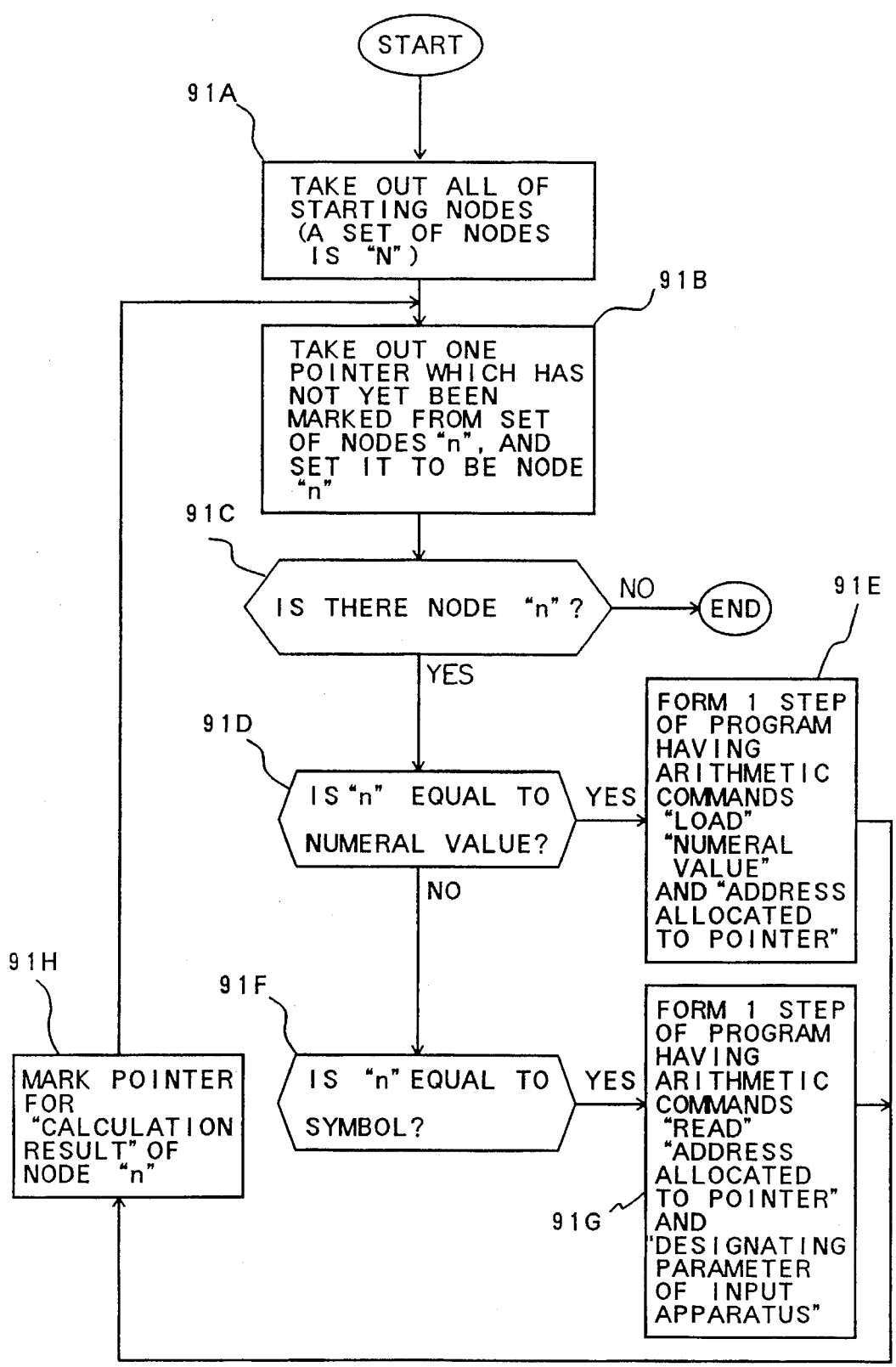
FIG. 37 is a flowchart explaining a detailed process sequence of the step 91 defined in FIG. 36.

FIG. 37 represents a detailed process sequence of the step 91.

Figure 38:
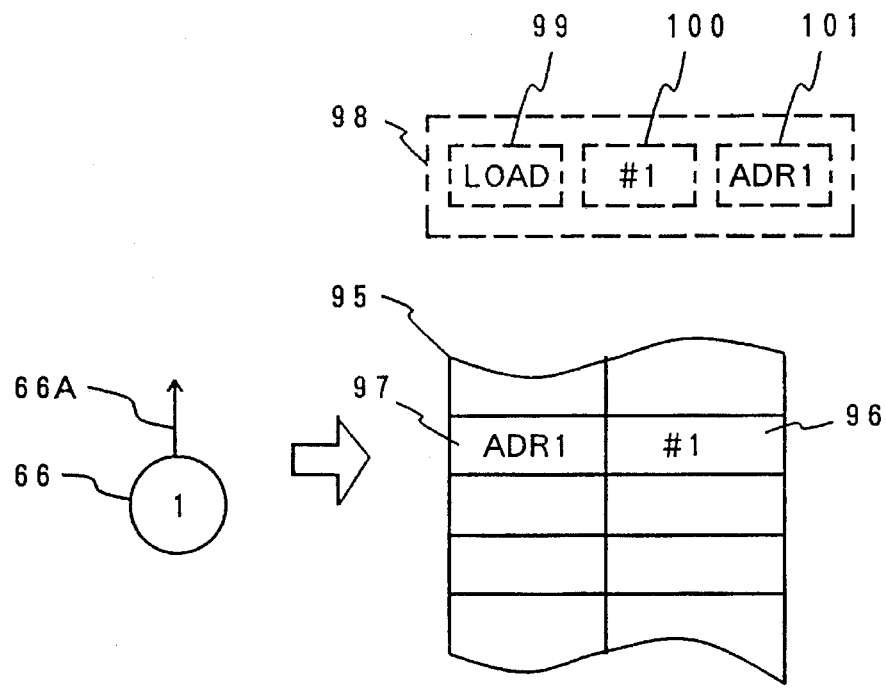
FIGS. 38 to 43 represent examples for forming a calculation process program defined at the step "G" of FIG. 3.

At a step 91A, all of the starting nodes in the graphic representation are taken out. In the graphic representation shown in FIG. 35, all of these starting nodes are the symbols A, B and D, and also the numeral values of 1, 2 and 10. At a step 91B, a node for which the pointer for the "calculation result" has not yet been marked is taken out from the derived starting nodes. That is to say, the nodes which have not yet been processed are derived therefrom. At a step 91C, a determination is made of whether all of the starting nodes have been processed, and then the process defined at the step 91 is accomplished. At a step 91D, it is determined whether the node taken out at the previous step 91C corresponds to a numeral value, and subsequently one step of the program for storing the numeral value at the designated address is produced at a step 91E. FIG. 38 shows a step 98 of the program produced under such conditions that the formula constructive element 66 is equal to a numeral value of "1" as one example of the process operation at the step 91E, and then the address 97 of the memory area 96 on the data storage region 95 in the storage device 7 for storing the computer program has been allocated to the pointer 66A of this calculation result. The step 98 of the program is constructed of an arithmetic instruction 99 and parameters 100 and 101. In this preferred embodiment, there is shown a step for executing a "LOAD" instruction 99 to directly store a numeral value "1" designated by the parameter 100 into a memory area at an address 97 similarly designated by the parameter 101.

Figure 39:
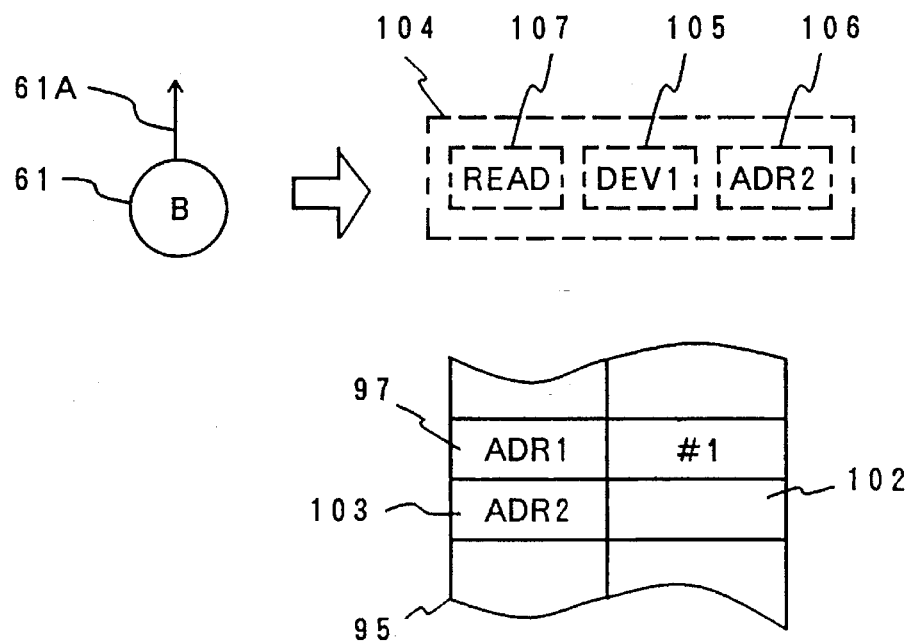

At a step 91F (FIG. 37), a determination is made of whether the node taken out at the step 91C corresponds to the symbol value, and subsequently one step of the program is produced by which the data which has been inputted via the designated input device at the step 91G is stored at the address corresponding to the symbol. FIG. 39 indicates a step 104 of the produced program in the case in which the formula constituent element 61 is equal to the symbol "B" as one example of the process defined at the step 91G, and then an address 103 of a memory area 102 on the data storage region 95 has been allocated to a pointer 61A of this calculation result. This example represents a step in which the numeral value inputted by an input device "DEV1" designated by a parameter 105 is read, and a "READ" instruction 107 is executed which is stored into the memory area at the address 103 similarly designated by a parameter 106.

Finally, a processed mark is attached to the processed node at a step 91H.

Furthermore, at a step 92 (FIG. 36), with respect to all of the memory areas corresponding to the pointers to be entered into the node of the graphic representation, a determination is made whether or not there is a node (operator) having a memory area where an instruction for storing a content thereof has been confirmed. Determining whether or not the instruction to be stored has been confirmed, may be achieved by checking the mark of the address corresponding to the pointer.

At a step 93, with respect to the respective operators selected by the judgement made at the step 92, one step of the program consisting of the corresponding arithmetic instructions is formed. After accomplishing the process of the step 293, with respect to the operator converted into the arithmetic instruction, a mark is attached on an address for storing the calculation result at a step 94 in order to indicate that the instruction for storing this calculation result has been confirmed.

Figure 40:
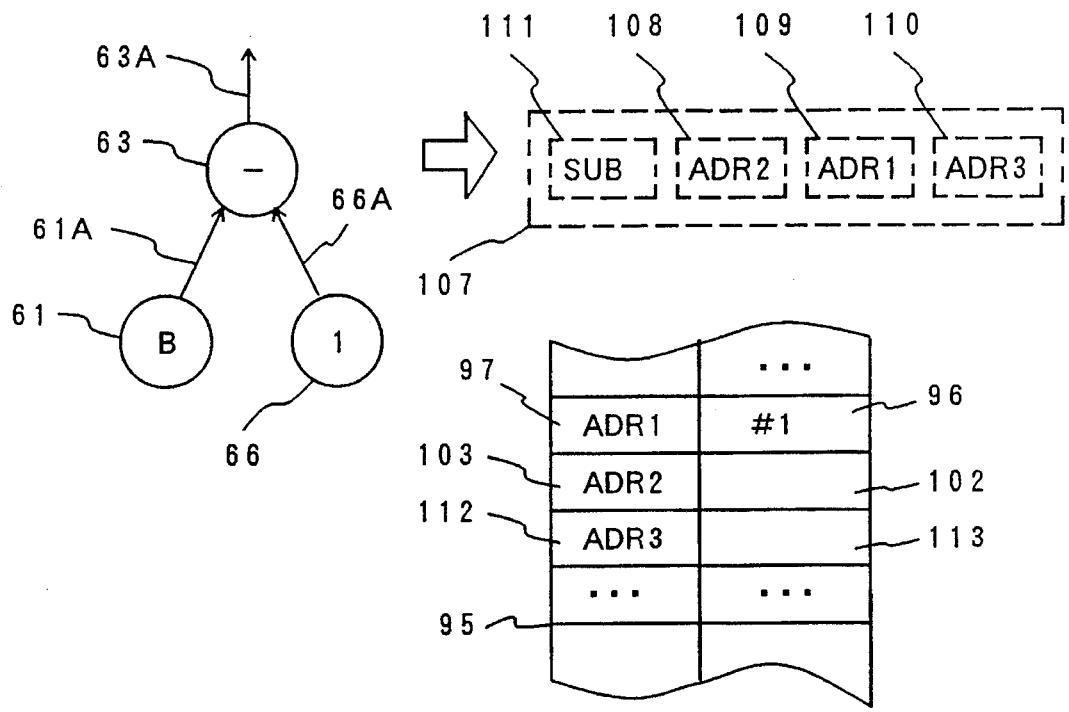

FIG. 40 represents a step 107 of the program which is produced when both a symbol "B" of a constituent element 61 where the instruction to store the value has been confirmed, and pointers 61A and 66A of a numeral value "1" for a constructive element 66 designate the operator "−" corresponding to a constructive element 63 for performing a subtraction. This example indicates a step 107 in which the difference is calculated between the symbol "B" and the numeral value "1" which have been stored into the memory areas 102 and 96 at the addresses 103 and 97 designated by the parameters 108 and 109, respectively, and a "SUB" instruction 111 to store this calculation result into a memory area 113 of an address 112 designated by a parameter 110.

Figure 41:
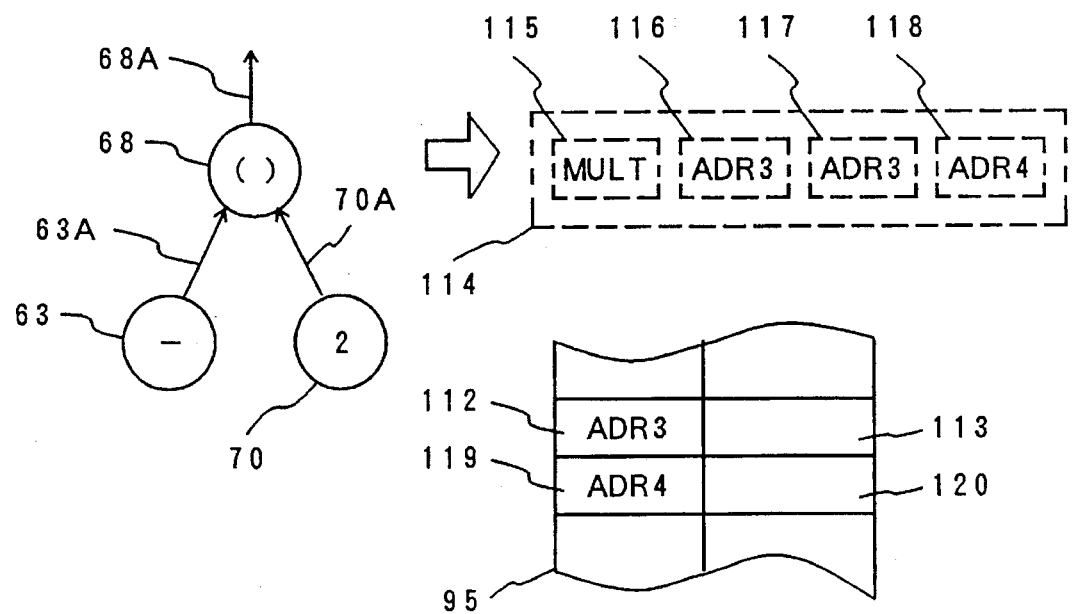

FIG. 41 represents one step of the program which is produced in a case in which pointers 63A and 70A for the operator "−" and also the numeral value "2" corresponding to the constituent element 70 in which the instructions to store the values have been confirmed, designate an operator "()" corresponding to the constituent element 68 for performing the calculation to the bracket. Reference numeral 68A denotes a pointer. This example represents a step 114 for executing a "MULT" instruction 115, in which a calculation result of the operator "−" is squared, has been stored in the memory 113 of the address 112 designated by parameters 116 and 117, and a squared value is stored into a memory area 120 at an address 119 designated by a parameter 118.

Figure 42:
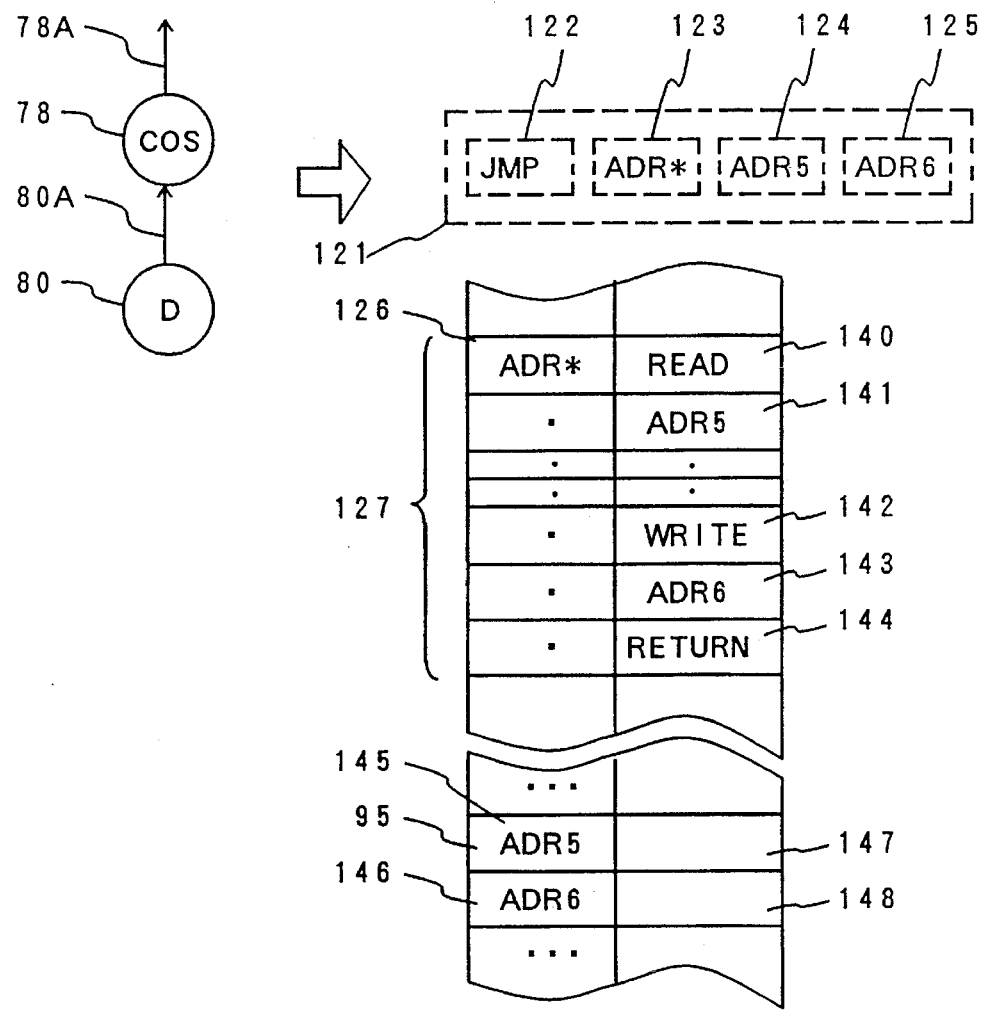

In addition, FIG. 42 indicates a step 121 of a program which is produced under such a condition that a pointer 80A for a symbol "D" of a constituent element 80 in which an instruction for storing a value has been confirmed, corresponds to a portion for designating an operator "COS" which is equal to a constituent element 78 for performing a trigonometry function calculation. This example indicates a step 121 for executing a "JMP" instruction 122 to call a program (subroutine program) in which a value of a trigonometry function is obtained based on the four rules of arithmetical operations by a series expansion approximation method. In this example, an address 126 of a region 127, into which the subroutine program to be called has been stored, is designated by a parameter 123. Into memory areas 140 to 144 corresponding to the region 127, the elements of the subroutine program have been stored. While the program is executed, the value of the symbol "D" is employed as an input of a trigonometry function calculation, and a value of a memory area 147 at an address 145 designated by a parameter 124 is transferred to the subroutine program. Similarly, a calculation result of the trigonometry function is stored into the memory area 148 at the address 146 designated by the parameter 125. It is so arranged that the subroutine program is returned to the called program in response to a "RETURN" instruction 144.

Figure 43:
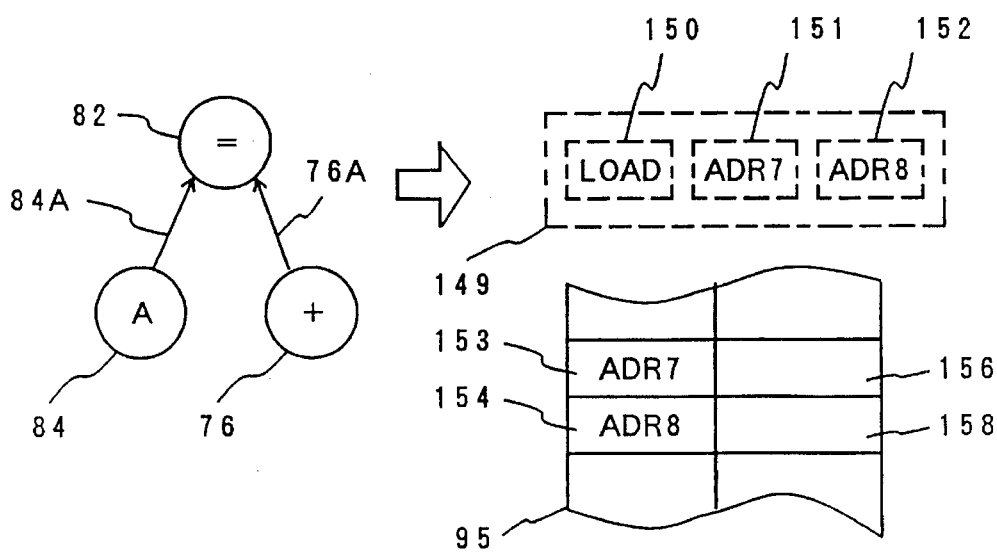

Although the operators are sequentially converted into the arithmetic instruction by repeating the process operations as defined at the previous steps 92 to 94, and thus one step of the program is produced in accordance with each of the process operations, an exception process operation is carried out at a step 93, as shown in the example of FIG. 43 with regard to the operator "=" indicative of an equal relationship. In other words, such as arithmetic instruction in formed that a calculation result of an operator 76 having a pointer 76A to designate an operator "=" corresponding to a constituent element 82 is substituted by a symbol 84 having a pointer 84A to designate the operator "=". A step 149 for executing a "LOAD" instruction is produced by which the content of a memory area 156 at an address 153, for storing therein the calculation result of the operator "+", is stored into a memory area 158 designated by an address 154 as a calculation result of the symbol "A". Reference numerals 151 and 152 indicate parameters.

One example of the program which has been formed in correspondence with the graphic representation shown in FIG. 35 as a result of the process operation effected at the above step G (FIG. 3), is represented in FIG. 44. In this figure, instructions and parameters of the program described by symbols have been stored in the storage region as the machine word in accordance with binary notation and are directly interpreted and executed in the arithmetic processing device of the computer.

At the step G, based on the arithmetic relationship among the constituent elements of the algebraic expressions which have been obtained at the end of the process operation at the step F, an arithmetic process program (FIG. 44) for obtaining the value of the algebraic expression represented in the region 133 (FIG. 4) is formed and thereafter stored into the storage device 7. Since this algebraic expression contains variables (B and L) as shown in FIG. 4, the formed arithmetic process program similarly contains the relevant variables.

In the above-described step G, there has been described that the virtual arithmetic instructions directly capable of handling the four rules of arithmetic operations are regarded as the instructions by the machine language. Since the subroutine program is constructed even by the conventional machine language and the microinstruction for handling the four rules of arithmetic operations may be defined, the methods for constructing the arithmetic instructions may be readily obtained as described in this example.

There is an advantage in the above-explained preferred embodiment that when the formula is entered, the total amount of data entries and the total number of operations may be reduced by referencing the data on the previously formed formulae and correcting these formulae. Moreover, the data matching characteristics of the formulae before and after corrections are maintained, so that erroneous data input operations occurring in the corrections may be prevented. Also, the inputted algebraic expressions are not only reserved as a part of information required for forming the designing document, but also are employed as information to form a program for calculating values thereof. That is to say, the information of the inputted algebraic expression is used for forming the designing document and also the program.

Subsequently, the process operation of the step H (FIG. 3) will now be explained.

Furthermore, in the step H according to the preferred embodiment of the present invention, the arithmetic process program formed by the process operation of the step G is executed so as to obtain the value of an algebraic expression, and then the calculation result is stored in the storage device 7. The values of symbols (variables) for the algebraic expression which have been entered in order to execute the arithmetic processing program are required to be entered by the input device designated in an input processing program which has been previously prepared for inputting these values into the arithmetic processing program, or in accordance with the input method. That is to say, either the values are required to be inputted with employment of the keyboard while a cursor is displayed on a character region 132 on the display screen of the display device 1, or the numeral values, displayed on the figure region as the graphic elements, are designated by utilizing a coordinate designating device so as to be employed as the numeral values to be inputted. This input process program is a generic process program capable of entering numerical values into variables of the respective arithmetic processing programs which have been formed with respect to various algebraic formulae, and is stored into the storage device 7. The input process program has the function of smoothly performing a predetermined calculation by way of the arithmetic process program by substituting the inputted numeral values into the corresponding variables whether one numeral value has been inputted for one variable, a plurality of numeral values have been entered for one variable, or a range of a numeral value has been entered to indicate a calculation range with respect to one variable. For instance, the numeral value data which have been described in the regions 131 and 132 are derived and are substituted into the variables of the arithmetic process programs corresponding to the above- described algebraic expression, whereby this program is executed. The corresponding relationship between the variable and the numeral value substituted for this variable is determined by designating the numeral value and symbol as the graphic element on the display screen by way of the input device. To execute the process operation defined at step H, a menu or the like with respect to the input form of the numeral value (one numeral value to be inputted is prepared for one variable, plural variables, or range) is first displayed on the display device 1 by way of the input process program. In accordance with such a menu, a user inputs relevant numeral values via the keyboard (input device 4). For instance, a numeral value of "40" in the region 131 is substituted for a variable "L" in the formula and a numeral value of "123" in the region 132 is substituted for a variable "B", and then the arithmetic process program is executed. The designation of these numeral values is effected by designating the graphic elements 134, 135, 136 and 137 corresponding to the variables and numeral values. It should be noted that the numeral values may be directly inputted from the input device such as a keyboard.

In the step I according to this preferred embodiment, the values of the calculation results for the algebraic expression obtained in the process of step H are displayed on the display screen in the form of numeral values, lists and graphic representations, and then are stored as the designing document information into the storage device 7 together with the information which is being displayed in other character regions and graphic regions.

Figure 45:
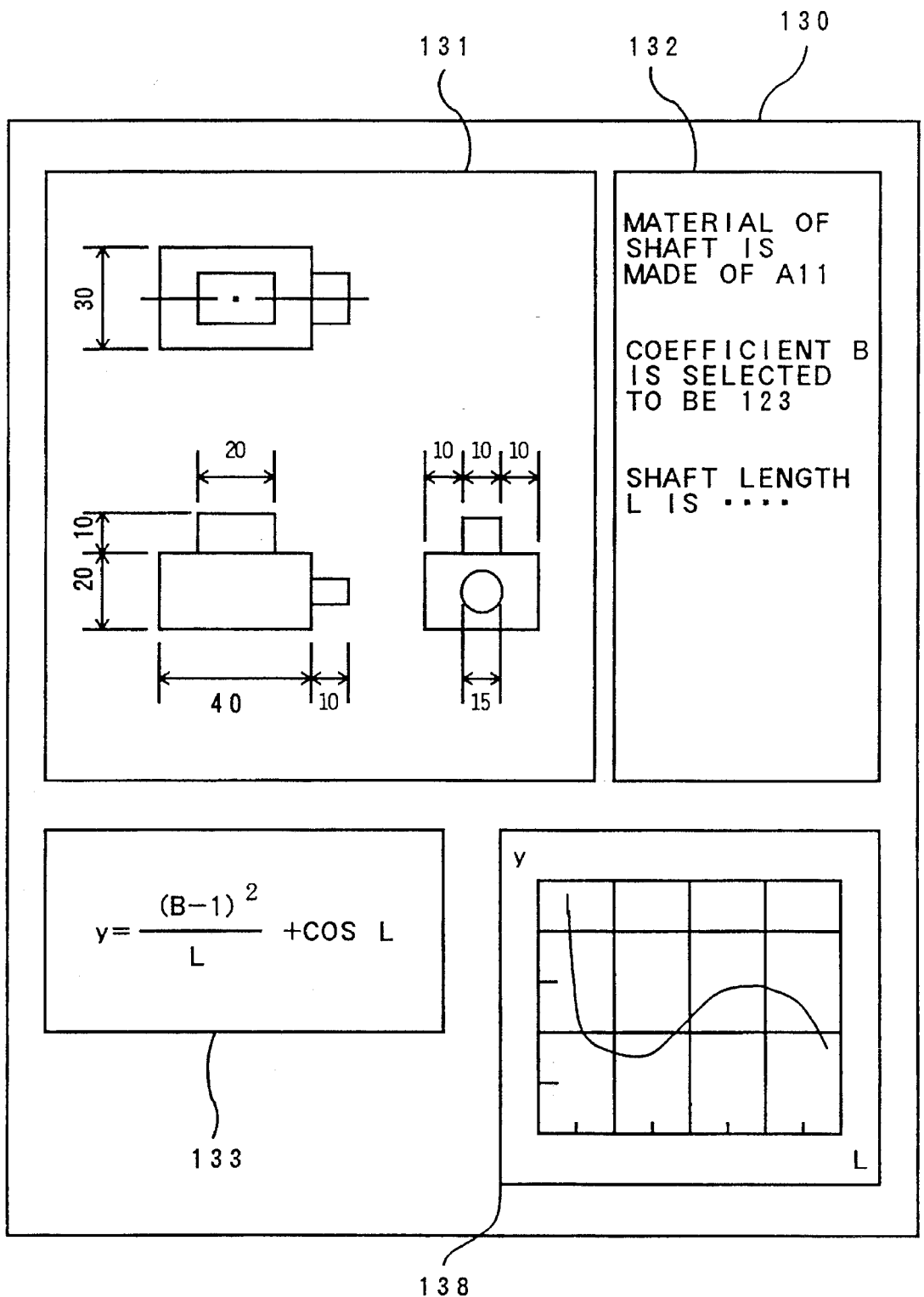
FIG. 45 is an explanatory diagram of another design document sample obtained in the preferred embodiment shown in FIG. 1.

At the step I, the execution results obtained at the step 10 are converted into the graphic and list forms constituted by the figures and characters corresponding to the graphic elements, and thus are assembled into the region of the designing document. This region may be provided at the position, the coordinate of which has been designated on the display screen by employment of the input device 4 by the user. FIG. 4 is an example in which the calculation result obtained in the step I is displayed on the region 137 within the character region 132. Also, FIG. 45 represents an example where the numeral value calculation result of the algebraic formula has been displayed in a graphic representation with the graphic region 138. In accordance with this example, there is shown with respect to the variables contained in the algebraic formula that the calculation result for the numeral value range of the variable designated by the step H has been displayed in a graphic representation. The calculation results with respect to the numeral range of the variable are obtained by designating an upper limit value and a lower limit value and also an interval between these limit values during the step for processing the input process program. In this preferred embodiment, since the arithmetic process program formed at the step F has been stored in a form that can be directly executed by the arithmetic processing device, both the input process program and the arithmetic process program may be executed by combining these programs, while changing the values of the variables in the numeral value range entered by the user. Also, since the algebraic expression has been just inputted, the user can understand what the variables of the algebraic expression imply, and therefore can substitute the proper numeral values for the variables.

Finally, the designing document may be formed by calling the designing document information which has been stored into the storage device 7 and by printing this information by a printer (not shown). Although the formation of designing documents has been described in this preferred embodiment, any other documents may be formed if these documents contain algebraic expressions represented by way of real mathematical notation. The present embodiment may be applied also to other algebraic expressions containing differential or integral expressions.

There is a particular advantage in the above-described preferred embodiment that a selection can be made of the numeral value from among the information displayed in the graphic representation by way of the operations on the display screen, and then the selected numeral value can be substituted for the variable required for calculating the formula.

As is apparent from the foregoing explanation, the following effects may be obtained according to this preferred embodiment.

First, there is a particular advantage that the arithmetic process program has been previously formed and stored based upon the algebraic expression inputted as the information on the designing document, and this arithmetic process program is directly executed during the calculation of the formula, whereby both arbitrary designation of the content of the process operation and execution of the process to perform the program by way of a compiler at high speed may be achieved at the same time.

Then, the user forms the designing document with a mixture of the drawings and documents by utilizing an interactive computer having graphic representing capabilities, and handles the algebraic expression as the graphic representation when editing the designing documents, whereby the displaying form thereof may be reserved as a portion of information contained in the designing document, and simultaneously the arithmetic information of the formula in the form, which can be calculated by the same computer, may be reserved. In other words, a formula is described in a one-dimensional character region formed in a character series according to the conventional formula inputting method. To the contrary, a formula may be entered in a form of algebraic expression represented by a so-called "natural language" which has been usually described in documents and publications such as science/engineering books and formula lists, so that the formula inputting method according to the present invention is suitable for reserving the formula as a portion of information on the designing document. It is possible to readily form such designing documents containing algebraic expressions, characters and calculation results thereof which include variables expressed by the natural language understandable by users who have not yet mastered program languages. It should be noted that document editing work correspond to a part of document formation work.

Arithmetic information corresponding to arbitrary algebraic expressions which have been represented in the natural language functioning as information on designing documents, may be freely and easily obtained.

Since the arithmetic process programs may be produced at any times in accordance with the inputted algebraic expressions, there is no need to produce the arithmetic process programs under such assumptions that these programs might be suitable for any cases, as described in JP-A-1-211067. Also, it may avoid such a problem as there being no corresponding arithmetic process program.

Further, since the formula constructive elements are arranged as the graphic elements on the display screen so as to directly input the formulae into the computer, the formula entry work may be readily achieved, and may be effectively entered therein, and also erroneous data entries may be prevented.

In addition, based upon the positional relationship between different types of formula constituent elements and the formula constituent elements displayed on the screen, the arithmetic relationship of the formula constituent elements thereof may be obtained, so that there is no need to input the formulae as the character series data. Accordingly, easy formula input operation may be achieved and higher operation capabilities may be realized.

On the other hand, no discrimination/classification of formula constructive elements is required in view of the data processing operation performed in the computer, and also no statement analysis is required, whereby an easy data processing operation is achieved so that the total amount of computation may be reduced.

Users merely intend to enter the formula constituent elements as graphic elements and also to display them on the display screen, so that the arithmetic relationships between the automatically inputted/arranged formula constructive elements and the formula constructive elements already are displayed on the display screen. As a consequence, the formula constituent elements are written into arbitrary positions on the display screen in arbitrary order to form the desired formulae, so that extremely high operabilities may be achieved. Also since such a formula constructing sequence is possible, the formula which has been once stored as the library may be again displayed as the graphic element, and also another formula may he newly produced by correcting the first-mentioned formula. This particular effect may be emphasized when a complex formula is formed and calculated in the computer system.

Furthermore, since the arithmetic process program for calculating the values of the formula has been stored in the storage device in a form which can be directly executed by the arithmetic process apparatus, fast program execution may be achieved. As other programs stored in the storage device are coupled with the program for calculating the values of formula and are executable, the process operations where the numerical computation is carried out while changing the parameters, and also the data input/output process operations, may be automatically performed, whereby process efficiency is increased.

In addition the data representative of the arithmetic relationship between the operators, symbols and numerical values to constitute the formula is automatically formed by arranging at the positions on the graphic display screen instructed by the user via the input device, the graphic element representative of the operators, symbols and numerical values of the formula for designating the sorts of input data. The resultant data may be directly utilized in the conversion processing operation from the formula into the computer program and the formula processing operations such as formula modifications and differentials.

Furthermore, a description will now be made of formula processing operations where a designing document for a plant control system is handled in accordance with another preferred embodiment of the present invention. Formation of control software programs will now be described, which programs are executable by a microcomputer mounted on a control device based on formulae functioning as information of designing documents.

Figure 46:
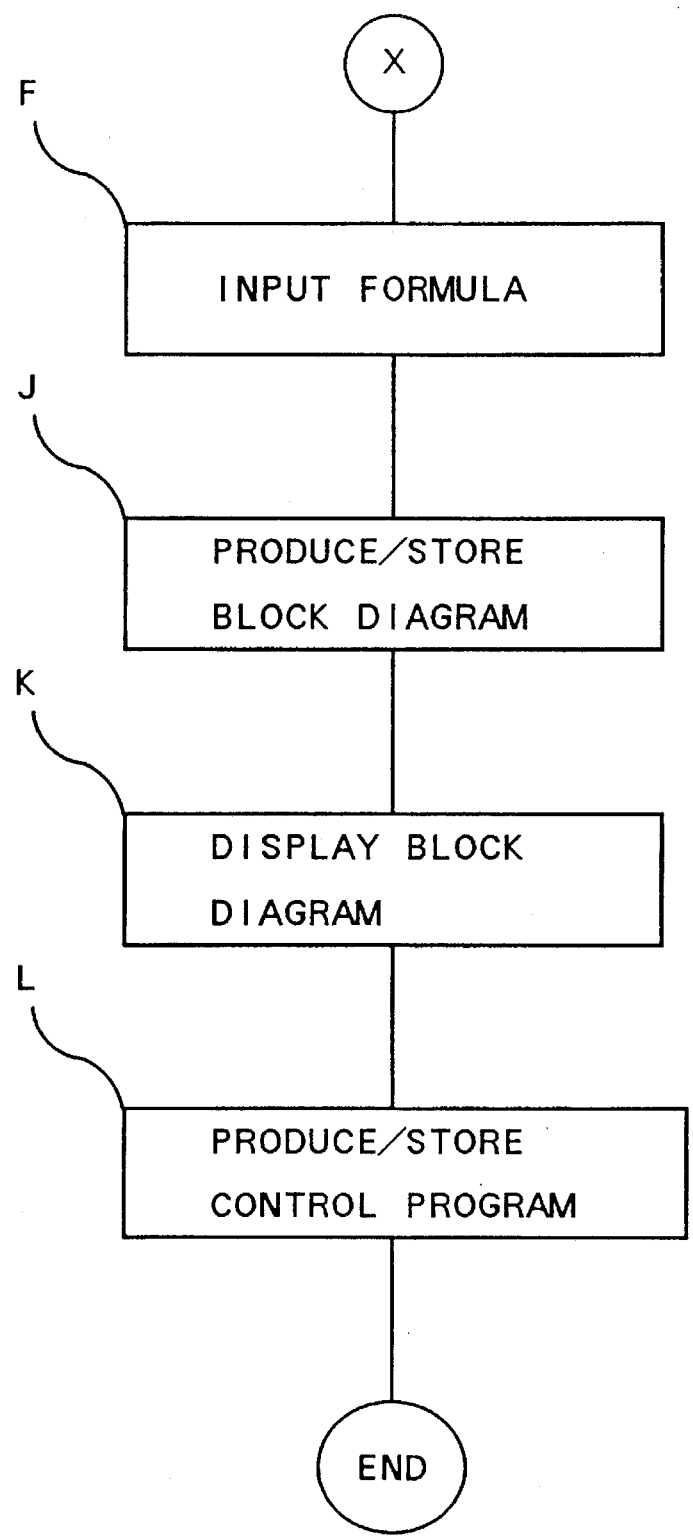
FIG. 46 is a flowchart explaining a process sequence executed in another preferred embodiment of the present invention.

In accordance with this preferred embodiment, the steps "A" to "F" explained in the above-described preferred embodiment are executed. Furthermore, steps "J" to "L" indicated in FIG. 46 will be executed.

Figure 47:
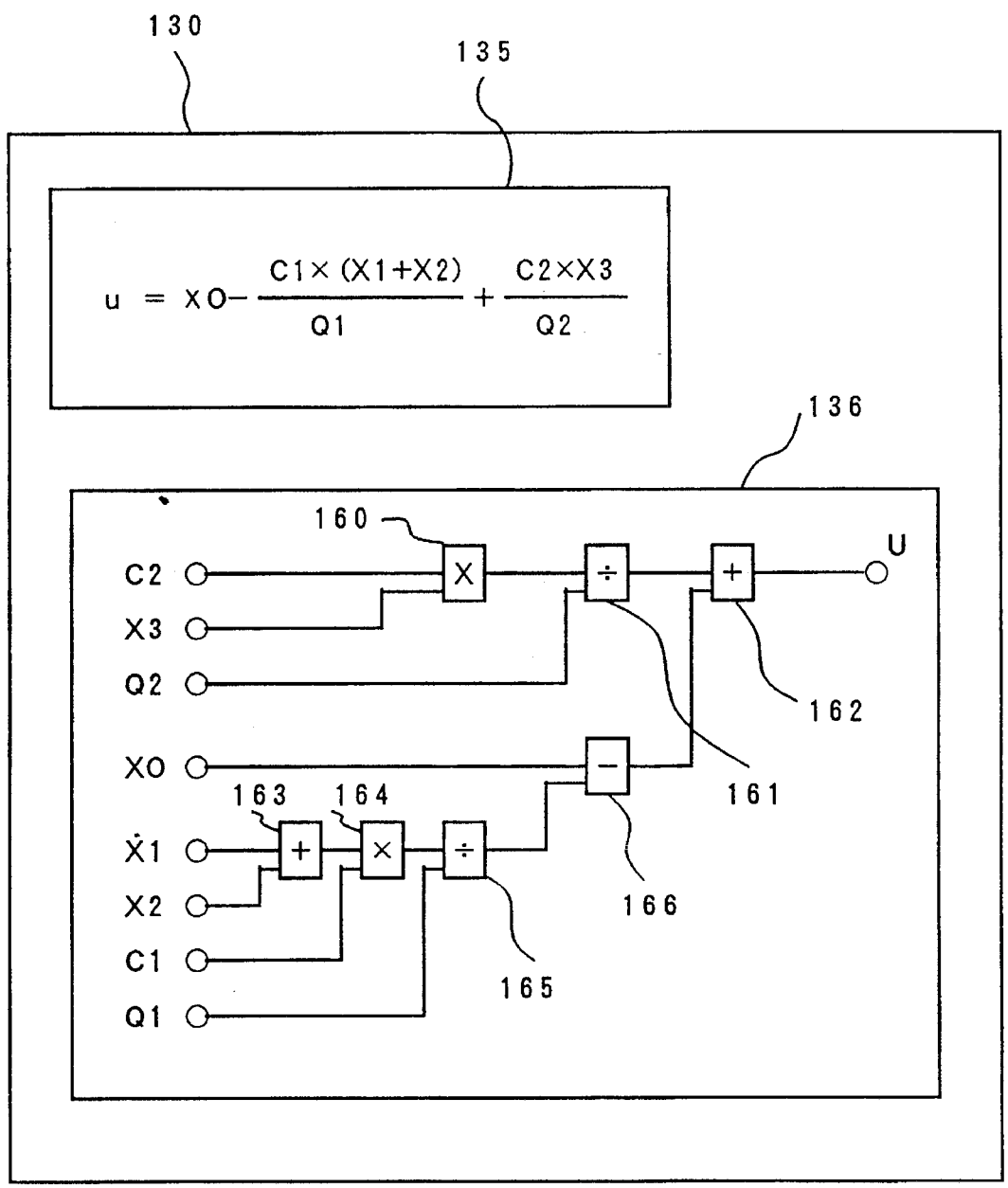
FIG. 47 is an explanatory diagram of a design document which has been obtained by executing the process sequence shown in FIG. 46.

In FIG. 47, there is shown an example in which an algebraic expression (indicated in a graphic region 135), represented by the real mathematical notation to indicate a control rule and a computation of a control signal, is inputted at the step F. As a result of step F, the graphic representation (FIG. 35) with respect to the algebraic expression written into the graphic region 135 is obtained. On the basis of the respective constituent elements and information of pointers shown in this graphic representation, a block diagram indicated in the graphic region 136 is formed (at step J). The information on this block diagram is stored in the storage device 7. The resultant block diagram is constructed such that both the constituent elements for the symbols and numeral values, and also the constituent elements for the operators, have been coupled with each other by the coupling information indicated by the pointers. Then, the formed block diagram is displayed at step K. FIG. 47 represents an example of a display screen when a designing document is produced in which the arrangement for the control system expressed by the algebraic expressions has been represented in the block diagram form. In this diagram, the block diagram formed based on the arithmetic relationship for the formula described in the region 135 has been assembled into the region 136. In accordance with this preferred embodiment, after the arithmetic relationship (i.e., graphic representation shown in FIG. 35) between the formula constituent elements has been obtained in the step F, the operators indicated in this graphic representation are substituted for the blocks 160 to 166 based on the method as described in the specification of Japanese Patent application No. 63-259044 to arrange the blocks, and both the arranging information on the block diagrams and the connecting information among the blocks are obtained via the step for arranging the connecting lines among the input/output terminals of the blocks. With employment of the graphic information obtained at step F, the control program is produced by a process operation similar to that of the step G as described in the above-explained preferred embodiment (at the step L). It should be noted that since the meanings of the instruction commands (for instance, LOAD, READ, SUB, MULT etc.) of the control program are different from those of the control software program as mentioned in the previous embodiment, instruction languages suitable for the control program are employed in this preferred embodiment. In FIG. 48, there is shown an example of the produced control program. Finally, the algebraic expressions, block diagrams and documents not shown in the drawing are read out from the storage device 7 and then printed out by the printer, so that the designing document related to the control device having the above-described control program may be obtained.

The various advantages as described in the above-explained preferred embodiment may be similarly achieved in this preferred embodiment.

On the other hand, a control calculation program may be directly formed from arithmetic relationships among formula constituent elements without employing graphic information in accordance with the below-mentioned preferred embodiment. When the formula constituent elements are converted into the calculation instructions of the control software program based on the steps 91 and 93 shown in FIG. 36, the formations of the machine language executable in the microcomputer built in the control device are converted into the calculation instructions. For example, referring now to a list, shown in FIG. 48, for representing a corresponding relationship between calculation instructions and machine languages corresponding to sorts of microcomputers, the control software program may be produced in accordance with the binary notation.

In the above-described preferred embodiment, the produced control calculation program may be temporarily stored in the storage device of the designing document editing apparatus, and may be a program which has been written into magnetic/optical recording mediums via magnetic disk devices, optical disk and the like connected to the output unit. Also, the above-described control calculation program may be directly written into the control device via a communication device to connect the output unit of the designing document editing apparatus with the storage device of the control unit.

In accordance with the present invention, documents containing algebraic expressions represented by natural languages may be produced, and also arithmetic information with regard to the above-described arbitrary algebraic expressions may be readily obtained.

We claim:

1. For operation on a processing system including a processor, a memory device, a display device, and an input device, a document preparation method comprising the steps of:

(a) inputting a mathematical expression in real mathematical notation via said input device for storage in said memory device, the mathematical expression including operators and operands as constituent elements;

(b) displaying the mathematical expression in real mathematical notation on said display device;

(c) analyzing the displayed mathematical expression with said processor, by:
      (1) analyzing positional relationships between each operator and respective adjacent operands of the displayed mathematical expression to thereby identify operands associated with each operator; and
      (2) storing the identified associated operators and operands in said memory device;

(d) when a set of the associated operators and operands presents the displayed mathematical expression as a desired algebraic equation, converting the set of associated operators and operands into a binary tree structure of the desired algebraic equation;

(e) creating a program for calculating the equation on the basis of the binary tree structure;

(f) executing the program on said processor; and (g) preparing a document including information resulting from step (f).

2. A document preparation method as claimed in claim 1, wherein, in step (g) the equation expressed in real mathematical notation is included on the document, together with information resulting from step (f).

3. A document preparation method as claimed in claim 2, further comprising the step of (h) inputting text through said input device; and wherein in step (g), the inputted text is included on the document, together with information resulting from step (f) and the equation expressed in real mathematical notation.

4. A document preparation method as claimed in claim 1, further comprising the step of (h) inputting text through said input device, and wherein in step (g), the inputted text is included on the document, together with the information resulting from step (c).

5. A document preparation method as claimed in claim 1, wherein the algebraic equation includes a plurality of constituent elements, and step (b) includes displaying graphical signs corresponding to the constituent elements of the equation on a display screen of said display device, with the position of each graphical sign on the display screen being adjustable by a user through said input device.

6. For operation on a processing system including a processor, a memory device, a display device, and an input device, a document preparation method comprising the steps of:

(a) inputting a mathematical expression in real mathematical notation via said input device for storage in said memory device, the mathematical expression including operators and operands as constituent elements;

(b) displaying the mathematical expression in real mathematical notation on said display device;

(c) analyzing positional relationships between each operator and respective adjacent operands of the displayed mathematical expressions to thereby identify operands associated with each operator;

(d) storing the identified associated operators and operands in said memory device;

(e) when a set of the associated operators and operands presents the displayed mathematical expression as a desired algebraic equation, converting the set of associated operators and operands into a binary tree structure of the desired algebraic equation;

(f) creating a program for calculating the equation on the basis of the binary tree structure;

(g) executing the created program on said processor; and (h) preparing a document including information resulting from step (g).

7. A document preparation method as claimed in claim 6, wherein step (b) includes displaying graphical signs corresponding to the constituent elements of the equation on a display screen of said display device, with the position of each graphical sign on the display screen being adjustable by a user through said input device.

8. A document preparation apparatus comprising:

a memory;

input means for inputting a mathematical expression expressed in real mathematical notation to said memory, the mathematical expression including a plurality of constituent elements;

display means for displaying the mathematical expression, including the plurality of constituent elements, expressed in real mathematical notation on a display screen; and a processor for analyzing the mathematical expression, as displayed in real mathematical notation to identify a desired algebraic equation, creating a program for calculating the equation, executing the created program, and preparing a document including information resulting from executing the program, said processor including means for analyzing the positional relationships between each operator and respective adjacent operands of the displayed mathematical expression to thereby identify operands associated with each operator,, means for storing the identified associated operators and operands in said memory; means for identifying a set of associated operators and operands as the desired algebraic equation, means for converting the identified set of operators and operands into a binary tree structure of the desired algebraic equation, and means for creating the program for calculating the equation on the basis of the binary tree structure.

9. A document preparation apparatus as claimed in claim 8, wherein said processor prepares the document with the equation expressed therein in real mathematical notation, together with the information resulting from executing the program.

10. A document preparation apparatus as claimed in claim 9, wherein said input means further inputs text, and wherein said processor prepares the document with the inputted text on the document, together with the equation expressed in real mathematical notation, and the information resulting from executing the program.

11. A document preparation apparatus as claimed in claim 8, wherein said input means further inputs text, and wherein said processor prepares the document with the inputted text on the document, together with the information resulting from executing the program.

12. A document preparation apparatus as claimed in claim 8, said display means displays graphical signs corresponding to the operators and operands, with the position of each graphical sign on the display screen being adjustable by a user through said input means.

13. A document preparation apparatus comprising:

a memory;

input means for inputting into said memory a mathematical expression expressed in real mathematical notation and having a plurality of constituent elements including operators and operands;

display means having a display screen, for displaying the mathematical expression expressed in real mathematical notation on said display screen; and a processor for analyzing positional relationships between each operator and respective adjacent operands of the displayed mathematical expression to thereby identify operands associated with each operator, storing the identified associated operators and operands in said memory, identifying a set of associated operators and operands as forming a desired algebraic equation, converting the identified set of operators and operands into a binary tree structure of the desired algebraic equation, with the operators being located as nodes of the binary tree, creating a program for calculating the equation on the basis of the binary tree structure, executing the created program, and preparing a document including information resulting from executing the program.

14. A document preparation apparatus as claim 13, wherein said display means displays graphical signs corresponding to the constituent elements of the equation, with the position of each graphical sign on the display screen being adjustable by a user through said input means.

15. For operation on a processing system including a processor, a memory, a display device having a display screen, and an input device, a document preparation method comprising the steps of:

(a) inputting a mathematical expression expressed in real mathematical notation into said memory with said input device, the mathematical expression having a plurality of consitutent elements including an operator, a symbol, a function, and a numeral value;

(b) defining regions on said display screen;

(c) inputting graphical commands to position the constituent elements within the defined regions on said display screen;

(d) displaying the mathematical expression on said display screen in real mathematical notation, with the constituent elements positioned within the defined regions;

(e) activating said input device to edit the mathematical expression as displayed on said display device in real mathematical notation, the edited mathematical expression including at least one numeral value;

(f) recognizing a positional relationship between constituent elements on the basis of the region to which each constituent element is assigned;

(g) comparing positional relationships between adjacent constituent elements;

(h) obtaining an arithmetic relationship among the constituent elements, based on the comparison, to identify a desired algebraic equation;

(i) creating a program to calculate the algebraic equation;

(j) forming the program on said processor;

(k) storing the program in said memory device;

(l) executing the program on said processor, including performing an input/output operation for data for the program; and (m) incorporating the result of the program execution into a document.

16. A document preparation method as claimed in claim 15 wherein step (f) includes each time a constituent element is positioned on said display screen, obtaining the arithmetic relationship between such constituent element and a constituent element already displayed in the region of such constituent element.

17. A document preparation method as claimed in claim 15, wherein step (a) further includes successively designating constituent elements displayed on said display screen to form the mathematical expression on said display screen.

18. A document preparation method as claimed in claim 15, wherein step (h) includes obtaining the arithmetic relationship between the constituent elements by utilizing a binary tree structure having the operators and the function located at nodes of the binary tree, and having symbol and numeral values located at end points of the binary tree.

19. A document preparation method as claimed in claim 15, wherein step (j) includes:

converting the operator and the function into arithmetic process instructions;

storing the numeral value in said memory as input data for the arithmetic process instructions;

substituting data stored in said memory for the symbol; and forming the program.

20. A document preparation method as claimed in claim 15, wherein step (a) includes inputting text and a drawing into said memory, and step (j) includes extracting a numeral value from numeral values included in the text and drawing for use in the program.

21. A document preparation method as claimed in claim 15, wherein step (l) includes expressing the result in the form of a list, and storing the list in said memory.

22. A document preparation method as claimed in claim 15, wherein step (l) includes expressing the result in the form of a graph, and storing the graph in said memory.

23. A document preparation apparatus, comprising:

a memory;

text preparation means;

drawing preparation means, including:

(a) a display device, including a display screen, (b) means for displaying on the display screen as a graphic image a mathematical expression expressed in real mathematical notation, the mathematical expression having a plurality of constituent elements, including operators, a symbol, a function, and a numeral value;

(c) input means for inputting constituent elements and layout information for the constituent elements for storage in said memory;

(d) image layout means for laying out the constituent elements on the basis of the layout information, to graphically display the constituent elements on said display screen;

(e) means responsive to the layout information for performing a comparison between adjacent constituent elements;

(f) means responsive to the comparison for determining an arithmetic relationship between each constituent elements and an adjacent constituent element; and (g) means for storing the arithmetic relationships in said memory; and arithmetic processing means for identifying a stored arithmetic relationship as a desired algebraic equation, creating and executing a program to calculate the algebraic equation on the basis of the arithmetic relationships, and preparing a document including information resulting from the program execution.

24. A document preparation apparatus as claimed in claim 23, wherein:

said input means includes means for defining regions on said display screen; and said determining means includes means for recognizing a positional relationship between constituent elements located in the same region of said display screen, means for comparing positional relationships between constituent elements, and means for producing the arithmetic relationship based on the comparison.

25. A document preparation apparatus as claimed in claim 23, wherein:

said input means includes means for defining regions on said display screen; and said determining means is further responsive to said image layout means positioning a constituent element on said display screen for determining the arithmetic relationship between such constituent element and a constituent element already displayed in the region of such constituent element.

26. A document preparation apparatus as claimed in claim 23, wherein said image layout means permits inputting, by said input means, of the constituent elements in an arbitrary order.

27. A document preparation apparatus as claimed in claim 23, wherein said determining means determines the arithmetic relationship as a binary tree structure having the operator and the function located at nodes of the binary tree and having the numeral value and the symbol located at end points of the binary tree.

28. A document preparation apparatus as claimed in claim 23, wherein said arithmetic processing means includes means for converting the operator and the function into arithmetic process instructions for said arithmetic processing means, means for storing the numeral value in said memory as input data for said arithmetic processing means, means for substituting data stored in said memory for the symbol, and means for creating the program.

29. A document preparation apparatus as claimed in claim 23, wherein said input means inputs text and a drawing for storage in said memory, and said arithmetic processing means includes means for extracting a numeral value from numeral values included in inputted text and drawing for use in the program.

30. A document preparation apparatus as claimed in claim 23, wherein said arithmetic processing means includes means for generating a result of executing the program in the form of a list, and means for storing the list in said memory.

31. A document preparation apparatus as claimed in claim 23, wherein said arithmetic processing means includes means for generating a result of executing the program in the form of a graph, and means for storing the graph in said memory.

32. For operation on a processing system including a processor, a display device, and an input device, a document preparation method comprising the steps of:

(a) inputting a mathematical expression in real mathematical notation into said processing system via said input device, the mathematical expression including operators and further operands;

(b) displaying the mathematical expression in real mathematical notation on said display device;

(c) analyzing positional relationships between each operator and respective adjacent operands of the displayed mathematical expression to thereby identify operands associated with each operator;

(d) when a set of operators and operands presents the displayed mathematical expression as a desired algebraic equation, converting the set of operators and operands into a binary tree structure of operators and operands of the desired algebraic equation;

(e) creating a program for calculating the equation on the basis of the binary tree structure;

(f) executing the program on said processor; and (g) preparing a document including information resulting from step (f).

33. For operation on a processing system including a processor, a display device, and an input device, a document preparation method comprising the steps of:

(a) inputting a mathematical expression in real mathematical notation into said processing system via said input device, the mathematical expression including operators, operands, and at least one local expression formed by at least one operator and operands, a calculation result of each of the at least one local expression being regarded as a further operand;

(b) displaying the mathematical expression in real mathematical notation on said display device;

(c) analyzing positional relationships between each operator and respective adjacent operands of the displayed mathematical expression to thereby identify operands associated with each operator;

(d) when a set of operators and operands presents the displayed mathematical expression as a desired algebraic equation, converting the set of operators and operands into a binary tree structure of operators and operands of the desired algebraic equation;

(e) creating a program for calculating the equation on the basis of the binary tree structure;

(f) executing the program on said processor; and (g) preparing a document including information resulting from step (f).

* * * * *